US012737370B1

(12) United States Patent
Kumar et al.

(10) Patent No.: US 12,737,370 B1
(45) Date of Patent: Sep. 15, 2026

(54) VISUALLY STRUCTURED RESPONSES WITH ACTION CONTROLS

(71) Applicant: Amazon Technologies, Inc., Seattle, WA (US)

(72) Inventors: Vinayshekhar Bannihatti Kumar, San Jose, CA (US); Rashmi Gangadharaiah, San Jose, CA (US); Manoj Ghuhan Arivazhagan, Sunnyvale, CA (US); Sandesh Swamy, Seattle, WA (US); Sopan Khosla, Sunnyvale, CA (US); Siddharth Satish Goyal, Ashburn, VA (US); Narjessadat Seyeditabari, Daly City, CA (US); Deepak Seetharam Nadig, San Jose, CA (US); Pranjul Dubey, Lynnwood, WA (US); James W. Horsley, Carnation, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/888,945

(22) Filed: Sep. 18, 2024

(51) Int. Cl.
*G06F 16/248* (2019.01)
*G06F 16/23* (2019.01)

(52) U.S. Cl.
CPC ........ *G06F 16/248* (2019.01); *G06F 16/2365* (2019.01)

(58) Field of Classification Search
None
See application file for complete search history.

(56) References Cited

U.S. PATENT DOCUMENTS 11,314,563 B1 4/2022 Singh et al.
12,499,111 B1 * 12/2025 Paul .................. G06F 16/24539
12,541,558 B1 * 2/2026 Thanvantri Vasudevan ................ G06F 16/906
12,572,614 B2 * 3/2026 Gelli ................... G06F 16/9538
12,572,867 B2 * 3/2026 Rashkevitch .... G06Q 10/06316
12,651,128 B1 * 6/2026 Levy ....................... G06F 40/40
12,681,945 B2 * 7/2026 Lin ....................... G06F 16/248
12,681,957 B2 * 7/2026 Grantham ............. G06F 16/285
2009/0024944 A1 1/2009 Louch et al.
2015/0188977 A1 7/2015 Berry et al.
(Continued)

FOREIGN PATENT DOCUMENTS

WO 2019113550 A1 6/2019

OTHER PUBLICATIONS

Prompting is Programming: A Query Language for Large Language Models (Year: 2023).*
(Continued)

*Primary Examiner* — Kim T Nguyen
(74) *Attorney, Agent, or Firm* — Athorus, PLLC

(57) ABSTRACT

Disclosed are systems and methods to intelligently present user interfaces that are dynamically generated based on the determined intent or needs of the user. For example, based on user requests or actions, the disclosed implementations may dynamically generate and present to a user one or more components that are relevant to the user. Such components may be generated and presented anywhere in a provider network environment, from within a console or home page to guide a user to a service and/or to respond to a user query, to within a software development service to provide a developer with code or other requested content.

21 Claims, 20 Drawing Sheets

(56) References Cited

U.S. PATENT DOCUMENTS

| | | | | |
|---|---|---|---|---|
| 2018/0330248 | A1 | 11/2018 | Burhanuddin et al. | |
| 2021/0064675 | A1 | 3/2021 | Chugh et al. | |
| 2021/0248205 | A1 | 8/2021 | Tank et al. | |
| 2021/0349757 | A1 | 11/2021 | Qiao et al. | |
| 2022/0300353 | A1 | 9/2022 | Singh et al. | |
| 2022/0311822 | A1 | 9/2022 | Nord et al. | |
| 2024/0394404 | A1* | 11/2024 | O'Neal | G06F 21/6245 |
| 2025/0028747 | A1* | 1/2025 | Hagler | G06F 16/338 |
| 2025/0088946 | A1* | 3/2025 | Grida Ben Yahya | H04L 41/16 |
| 2025/0252376 | A1* | 8/2025 | Singh | G06F 9/454 |
| 2025/0298970 | A1* | 9/2025 | Khosla | G06F 40/20 |
| 2025/0315429 | A1* | 10/2025 | Kawai | G06F 16/245 |
| 2025/0342323 | A1* | 11/2025 | Spiteri | G06F 40/103 |
| 2025/0371260 | A1 | 12/2025 | Yao et al. | |
| 2025/0384380 | A1* | 12/2025 | Inampudi | G06Q 10/0639 |
| 2025/0384495 | A1 | 12/2025 | Mahal | |
| 2026/0003928 | A1 | 1/2026 | Tabb et al. | |
| 2026/0017285 | A1* | 1/2026 | Grantham | G06F 16/285 |
| 2026/0056932 | A1* | 2/2026 | Bathula | G06F 16/2365 |
| 2026/0056945 | A1* | 2/2026 | Ghosh | G06F 16/24522 |
| 2026/0056958 | A1* | 2/2026 | Zhou | G06F 16/24578 |
| 2026/0064379 | A1* | 3/2026 | Briant | G06F 8/33 |
| 2026/0064380 | A1* | 3/2026 | Briant | G06F 8/35 |
| 2026/0064400 | A1* | 3/2026 | Briant | G06F 8/38 |
| 2026/0072928 | A1* | 3/2026 | Das | G06F 16/248 |
| 2026/0127386 | A1* | 5/2026 | Tomasini | G06F 16/3329 |
| 2026/0161899 | A1* | 6/2026 | Reed | G06F 16/3329 |
| 2026/0178571 | A1* | 6/2026 | Hamzeh | G06F 16/243 |
| 2026/0195617 | A1* | 7/2026 | Lee | G06N 5/04 |

OTHER PUBLICATIONS

Contextual Dynamic Prompting for Response Generation in Task-oriented Dialog Systems (Year: 2023).*

* cited by examiner

FIG. 15

VISUALLY STRUCTURED RESPONSES WITH ACTION CONTROLS

BACKGROUND

Machine learning (ML) refers to a discipline by which computer systems can be trained to recognize patterns through repeated exposure to training data. The use of a trained model in production is often referred to as "inference," during which the model receives new data that was not in its training data set and provides an output based on its learned parameters. In contrast to machine learning (ML), artificial intelligence (AI) refers to a human perception of a computer system as possessing a capability typically considered to require intelligence.

Large language models (LLMs) are ML/AI systems designed to understand and generate human-like text. These models are trained using machine learning techniques, typically on vast amounts of text data from the internet, books, articles, and other sources. Often, LLMs use a type of neural network called a transformer to process and understand the patterns and structures of language.

The underlying model of an LLM often consists of millions or even billions of model parameters, which are adjustable values that determine how the model behaves. The models are typically trained using a process called unsupervised learning, where they learn to predict the next word or sequence of words in a sentence based on the context provided. By doing so, LLMs develop an understanding of grammar, syntax, and semantics. As a result, LLMs are being increasingly deployed to aid in a variety of fields, including customer support, healthcare, language translation, education, software development, finance, and more.

BRIEF DESCRIPTION OF DRAWINGS

Various examples in accordance with the present disclosure will be described with reference to the drawings, in which:

FIG. 15 is a block diagram of an example provider network that provides a storage service and a hardware virtualization service to customers according to some examples.

DETAILED DESCRIPTION

Figure 1:
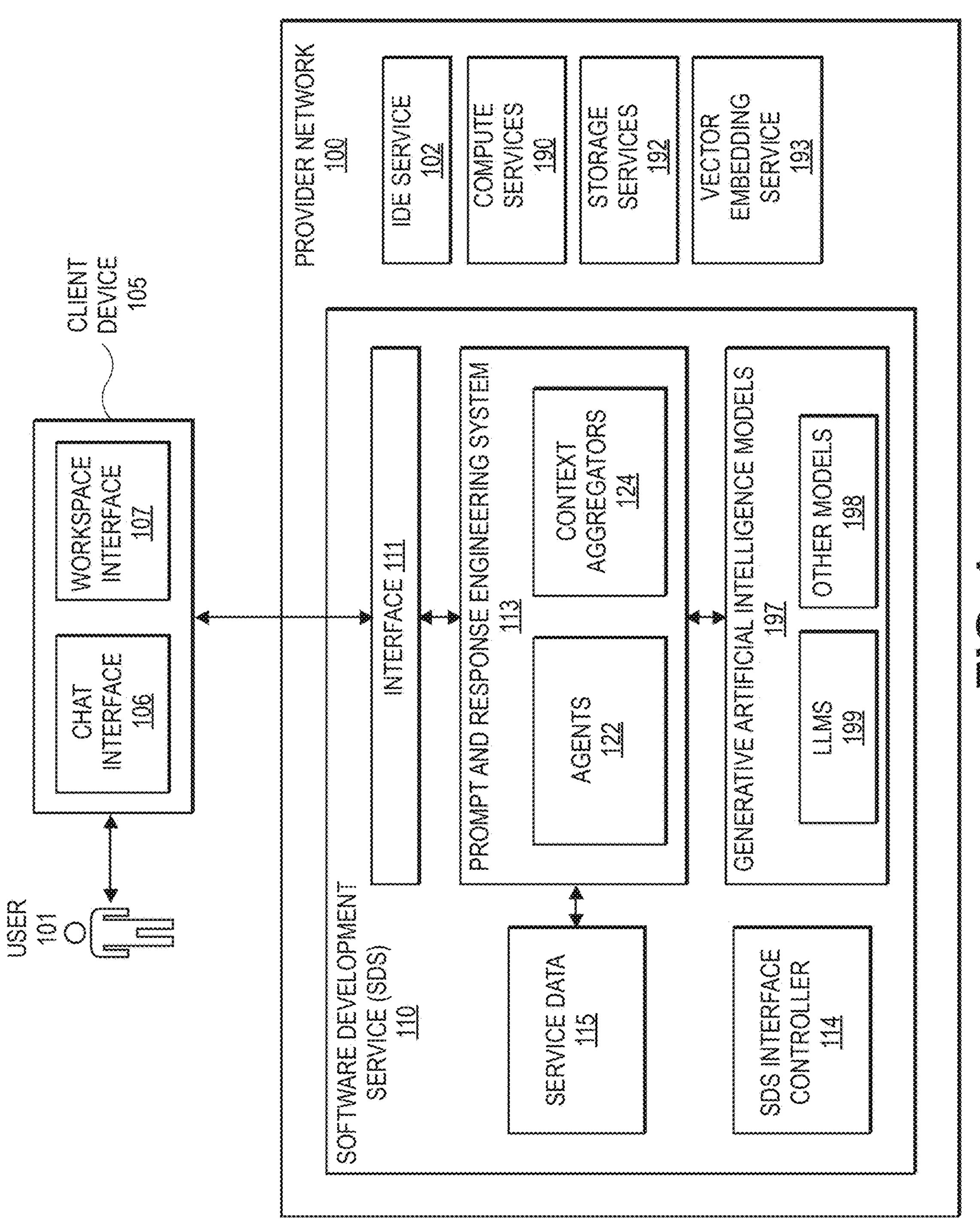
FIG. 1 depicts a high level overview of a software development service and environment according to some examples.

The increasing adoption of cloud computing has resulted in highly functioning, yet complex cloud computing environments that offer a wide range of services. For example, a cloud computing environment, also referred to herein as a provider network, may offer, for example, storage services, compute services, software development services, generative artificial intelligence ("AI") services, just to name a few. While such functionality is helpful, users may find the vast array of services and other features overwhelming and difficult to navigate.

As discussed further herein, the disclosed implementations describe systems and methods to intelligently present user interfaces that are dynamically generated based on the determined intent or needs of the user, generally referred to herein as the "user intent." For example, based on user requests or actions, the disclosed implementations may dynamically generate and present to a user one or more components that are relevant to the user. Such components may be generated and presented anywhere in the provider network environment, from a console or home page to guide a user to a service and/or to respond to a user query, to within an SDS to provide a developer with code or other requested information.

Still further, a user trajectory may be determined based on user activity of a user while accessing the provider network and, in accordance with the disclosed implementations, a next best action(s) between the current user action and a predicted destination action of the user may be determined and proactively suggested to the user to guide the user. Still further, user activities may be monitored as a user flow between a defined start activity and destination activity, where any number of different flows containing any number of different actions may be followed by users between the start activity and the destination activity. Such information may be aggregated among multiple users and used to determine an optimal flow between a start activity and a destination activity, determine next best action recommendations to present as part of a user flow, and/or to provide recommendations as to how to improve user flows between a start activity and a destination activity.

In still other examples, the disclosed implementations may process the vast corpus of supporting documentation often available in a provider network environment and determine segments of documents that are the same, conflicting, or that encompass other segments of documents. Still further, document segments that are determined to be the same, conflicting, or encompassing, may be aligned so that each segment is consistent. In some implementations, a canonical segment may be generated and each of those segments associated with that canonical segment such that if a change is made to the content of the canonical segment that change can be automatically updated in all other linked segments of different documents. Still further, as new documents are generated, that canonical segment may be included in the new document and linked to the canonical segment, thereby ensuring that the new document remains consistent with the other documents of the corpus.

Accordingly, disclosed are methods, apparatus, systems, and non-transitory computer-readable storage media for a provider network. The provider network and/or an SDS of the provider network can assist with a variety of software development efforts, including for complex tasks that involve multi-step reasoning or require large amounts of user-specific context, by leveraging generative artificial intelligence (GAI) models such as LLMs. GAI models can create new data instances as output. A new data instance means that it is generated by the model based on the model parameters and is not carried over from the model input or otherwise copied from outside the model (for example, from an index of searchable content). Example efforts include developing software project plans, dividing development tasks into sub-tasks or actions, and troubleshooting errors. The SDS acts as an intermediary between users and GAI models, enriching user prompts with additional instructions and/or context, monitoring model responses, and, in some cases, performing various "under-the-hood" interactions with the model without requiring action by the user.

In some examples, the SDS and/or integrated development environment ("IDE") includes agent applications that formalize various software development effort workflows and their interactions with an LLM. Agent applications serve as an intermediary between a user and an LLM, operating to expand user prompts, curate LLM responses, and provide the LLM with additional context often without user intervention. Additionally, various control mechanisms that regulate interactions with an LLM are introduced by way of example in the agent applications. Such control mechanisms can be used to avoid circular conversations with an LLM, keep the LLM on task, validate LLM responses, etc.

Existing LLMs have a very unidirectional conversation approach that requires users to have a well specified question or prompt to get a result that matches their expectations. With a well-defined prompt, LLM systems can create or modify software systems in a manner that respects the boundaries of the given description. While this is an impressive feature, it lacks the interaction that usually happens between engineers and product managers during the requirements engineering phase in which design considerations for a software system are defined. In some examples, a system design agent of the SDS can cause an LLM to ask clarifying questions regarding an initial prompt to gather answers to various design considerations. Such design considerations can include scope, requirements, and priorities, such as the geographic region(s) in which to host the system, whether the application should be distributed, the expected workload of the system (e.g., to understand how much compute and storage resources to allocate), the types of compute and/or storage resources to use to host the system, programming languages and/or frameworks to use or leverage, whether the application should operate with synchronous or asynchronous transfers between components, which aspects of the CAP (Consistency, Availability, Partition tolerance) theorem to prioritize (in the case of a distributed system), etc. The SDS can gather additional information about existing software systems associated with the user. Using that gathered information, the SDS can attempt to answer the clarifying questions. For example, if a question involves the specification of a programming language to use for a task, the SDS can infer that a client would use Python where the system (if modifying an existing system) or most of the other systems of the client (if creating a new system) are authored in Python. When a clarifying question from the LLM remains unanswered from the gathered information, the SDS can prompt the client to provide an answer. When answering the SDS's clarifying questions with information that is relevant beyond the current project and task, such as a company's preference for private subnets in a virtual private cloud ("VPC"), developers can ask the SDS to retain this information for future reference and share it across accounts within their same organization. These preferences are stored alongside any business jargon dictionary and used to augment future prompts to the SDS's model. By providing answers to the LLM's clarifying questions, the SDS improves the degree to which the LLM can propose solutions that meet the client's design requirements.

An LLM, as used herein, may be a form of a foundation model ("FM"). FMs are large deep learning neural networks trained on a broad spectrum of generalized and unlabeled data and capable of performing a wide variety of general tasks such as understanding language, generating text and images, and conversing in natural language. Foundation models, such as LLMs, generate output from one or more inputs (prompts) in the form of human language instructions. FMs are based on complex neural networks including generative adversarial networks (GANs), transformers, and variational encoders. Although each type of network functions differently, the principles behind how they work are similar. In general, an FM uses learned patterns and relationships to predict the next item in a sequence. For example, with image generation, the model analyzes the image and creates a sharper, more clearly defined version of the image. Similarly, with text, the model predicts the next word in a string of text based on the previous words and its context. It then selects the next word using probability distribution techniques. FMs may use self-supervised learning to create labels from input data. This means the FMs have not been instructed or trained with labeled training data sets. This feature separates LLMs from previous ML architectures, which use supervised or unsupervised learning.

In some examples, a development task agent of the SDS can cause an LLM to subdivide a given software development task into discrete actions by prompting the LLM for the set of actions a user would need to take to complete a particular task. Exemplary tasks include modifying an interface between software components, adding support for a new feature, changing an order processing backend on a website, migrating data from one database to another, etc. For each action, the development task agent obtains detailed actions from the LLM for the developer to take to complete the action. The development task agent tracks the gathering of this detailed information, keeping the LLM on task by including context related to the status of the additional detailed information gathering in subsequent prompts. Doing so avoids relying on the "memory" of the LLM, which often is limited in size and can fade as the number of interactions with the LLM increases, often resulting in unwanted effects such as straying off task. In some examples, the detailed actions include generated code snippets, which the development task agent can provide to the user such as with a link to the source code file in which the change is to be made, a display of a code diffs (e.g., a display of the code indicating before and after the suggested to-do), and other information. In some examples, the stored tracking data allows users to iteratively break down particular actions into more discrete actions (e.g., a top level task divided into a plurality of level 1 tasks, a level 1 task divided into a plurality of level 2 tasks, and so on).

FIG. 1 depicts a high level overview of an SDS 110 and environment according to some examples. An SDS 110 acts as an intermediary that interfaces with generative artificial intelligence ("GAI") models 197, such as language models, on behalf of clients 101. Language models probabilistically generate natural language (e.g., the word "said" is more likely to appear after the word "he" than after the word "dolphin"). LLMs are one type of language model developed with a neural network architecture often including millions or even billions of model parameters, which are trained using datasets of documents that determine how the model behaves. The size of such datasets can include thousands, millions, or even more documents. Exemplary LLMs include OpenAI's GPT-3.5 and GPT-4, Google's PaLM or PaLM 2, etc. As an intermediary, the SDS 110 can manage client interactions with GAI models. For example, the SDS 110 can receive prompts before submitting them to an LLM and can curate LLM responses. Expanding prompts can provide the LLM with additional information relevant to a particular task, including by adding additional context about the nature of the prompt and by adding context-specific details. For example, as discussed further below, an LLM prompt may be expanded to include information related to a user request and/or options for responding to the prompt.

With prompt expansion, the SDS 110 can improve the quality of LLM responses. Curating LLM responses verify LLM responses are within the scope of a given task, validate that the LLM responses are syntactically correct, visually engaging to the user, etc. In some examples, the SDS 110 can manage some exchanges of information with a language model such as the LLM 199 without engaging or with limited engagement of a client or user 101. For example, when determining content to present to a user, the SDS 110 may generate and provide prompts to the LLM and receive responses from the LLM that are used to generate graphically engaging content that is presented to the user.

One common environment for an SDS is a provider network 100. A provider network 100 (or, "cloud" provider network) provides users with the ability to use one or more of a variety of types of computing-related resources such as compute resources (e.g., executing virtual machine ("VM") instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service or compute service 190 that can execute compute instances, a storage service 192 that can store data objects, etc., a vector embedding service 193 that can generate vector embeddings indicative of objects (e.g., documents, source code, etc.), and/or other services 194. The users 101 (or "customers") of provider networks 100 can use one or more user accounts that are associated with a customer account, though these terms can be used somewhat interchangeably depending upon the context of use. Users 101 can interact with a provider network 100 through a client device 105 via one or more interface(s), such as through use of application programming interface (API) calls, via a console implemented as a website or application, etc. Such interfaces may include, but are not limited to a workspace 107 and/or chat interface 106.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time, but close enough together to meet a latency requirement for intra-region communications. The data centers house physical computing devices (e.g., suitable types of servers) that host the bare metal and virtualized resources (e.g., compute, networking, & storage) on which cloud services and customer workloads run.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users 101 of the provider network 100 to execute their code on cloud resources without having to select or manage the underlying hardware resources used to execute the code. For example, a user can use an on-demand code execution service by uploading their code and using one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users 101 of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The SDS 110 can assist users 101 with various software development tasks. Example software development tasks include development of software project plans, subdividing a software development task into steps, troubleshooting software errors, transforming code from an old or out of date version to a current version of the code (e.g., Java 8 to Java 17), transforming code from one language or platform to another (e.g., .net to Linux), etc. Strung end-to-end, these tasks can represent a large portion of an overall software development effort, from planning to implementation and troubleshooting. Note that as used herein, a software system can refer to an individual program or to a collection of programs, context about the program(s) such as their operating environment and/or structure on which they are executed or distributed (e.g., cloud-level resources), mappings of communications or data flows between the programs (if applicable), etc.

As illustrated, the SDS 110 includes an interface 111, a prompt and response engineering system 113 that includes agents 122 and context aggregators 124, service data 115, generative artificial intelligence models 197, such as LLMs 199 and/or other models 198. The interface 111, typically an API, provides different entry points for clients to interact, via the SDS 110. A user 101 interacts with an SDS 110 via an electronic device 105. The electronic device 105 can display one or both of a chat-based interface 106, workspace interface 107, which may include or encompass the chat-based interface 106, and/or other interfaces. Interfaces 106, 107 send and receive data via the interface 111 of the SDS 110. The chat-based interface 106 can be part of a graphical user interface providing a “chat” type interface commonly associated with LLMs in which users can type text and receive responses.

The workspace interface 107 may communicate through the interface 111 with the IDE 102 and provide IDE projects to the user so the user can develop code, make modifications to their software, refactor code, etc.

The interface 111 can also provide a more programmatic entry point for other applications or services such as an issue management service (also sometimes referred to as issue tracking service), a logging service of the provider network, or the application displaying the interfaces 106, 107 (e.g., an IDE or issue management application executed by the electronic device 105). API calls via these type of entry points can include, like the chat-based interface, free-form text (e.g., bug descriptions or change requests from an issue tracking system, error messages from the logging service, IDE project snapshots, transaction logs indicating changes to an IDE project, etc.) but further include additional contextual parameters available to the application or application environment issuing the call (e.g., an identification of the code repository associated with a particular software change request, an identification of the cloud-hosted instance generating a log entry, etc.).

Generally speaking, the SDS API 111 can provide for interactions with various clients, including human users such as user 101 via interfaces 106, 107, and with other applications such as IDEs, software management systems, issue tracking systems, help systems, etc. These application-based clients typically interact with the SDS API via calls having a more structured set of parameters (e.g., accepting a structured format file that includes identifications of various data sources) as compared to the freeform text found in calls from the chat-based interface 106, for example.

The SDS 110 can support multi-tenancy, allowing multiple clients to connect and interact with LLMs 199. Each client can have one or more sessions with the SDS 110, the sessions corresponding to sessions with an LLM 199 and/or other services of the SDS, such as the IDE service 102. To do so, the SDS 110 can track, for a given session, the last N prompts sent to, and responses received from the LLM in a memory such as in service data 115. The memory can be implemented as a moving window or circular buffer: as new prompts are sent and responses received, the SDS 110 deletes or overwrites the oldest entries. For a given session, the prompt and response engineering system 113 may embed all or a portion of the session memory in prompts submitted to the LLM by any of the agents 122. For example, if a session includes session history X and a new prompt P, the prompt and response engineering system 113 can concatenate P to X or to the most M most recent prompts and responses (where M<N) and submit the result of the concatenation to the LLM.

The SDS 110 can assign a session identifier to new sessions, allowing clients to pause and resume sessions. By referencing a session identifier upon connecting to the SDS 110, a client can return to an existing session. The SDS 110 can permit access to sessions based on a permissions policy associated with a principal account credential provided in establishing a connection to connect to the SDS 110. The credential may be associated with a user or group of an organization. The permissions policy can permit sharing of a session across different entities within the organization. For example, a first client may initiate a first session with the SDS 110 and receive a session identifier X. Later, a second client may resume the first session with the SDS 110 by providing the session identifier X, provided the credential provided when the second client established the connection to the SDS 110 is permitted to do so.

The prompt and response engineering system 113 can also monitor client text inputs over a session for certain session-management instructions. Such session-management instructions can be associated with various session-level operations. One example session-level operation is SESSION_RESET to reset a session, clear the memory associated with that session, and reset the associated session(s) with LLMs 199. Another example session-level operation is SESSION_CLOSE to close a session with the SDS 110 and any associated session(s) with LLMs 199.

The prompt and response engineering system 113 includes agents 122 and context aggregators 124. Agents 122 include various task-specific agents as well as other general agents that support SDS interactions with an LLM 199. Task-specific agents formalize various software development effort workflows, operating to expand user prompts, curate LLM responses, and provide the LLM with additional context often without user intervention. Context aggregators 124 retrieve additional data that agents can use to expand prompts or to otherwise provide to an LLM as conversation context to improve the relevance of LLM responses. The context aggregators 124 can retrieve the additional data from other cloud-based services, such as compute services 190, storage services 192, IDE services 102, other services 194, etc.

Service data 115 can include data such as prompt templates, response definitions, user preferences, session state data, etc.

GAI models 197 include LLMs 199 and other models 198. LLMs are artificial intelligence systems designed to understand and generate human-like text. These models are trained using machine learning techniques, typically on vast amounts of text data from the internet, books, articles, and other sources. Often, LLMs use a type of neural network called a transformer to process and understand the patterns and structures of language. In some examples, the SDS leverages an LLM trained on the documentation of provider network services as well as application documentation and code examples of applications hosted by or that interface with services of the cloud provider network. The SDS can also leverage a more general-purpose LLM trained on a larger variety of texts. Other models 198 can include code generation models, which may be within the same family as LLMs but trained and/or fine-tuned on a corpus more narrowly curated to software development documents (e.g., application code, comments, documentation, programming books, etc.) rather than general texts encompassing a range of other fields. A code generation model used to generate code for an SDS as described herein can include a reference tracker or origin tracker feature, which can identify when outputs of some threshold size (e.g. line(s) of code, number of words/tokens) are similar to or the same as instances of its training data and then provide metadata about that training data (e.g., author, license terms such as an open source license, link to original source repository) to the user. The SDS can receive such metadata and display it to the user so that the user can decide whether they would like to accept or modify the code suggestion or ask for a different generated suggestion.

In the illustrated example, the SDS 110 further includes an SDS user interface controller 114. The SDS UI controller 114 can manage interactions between the SDS 110 and a user interface such as the chat-based interface 106 or workspace interface 107, interactions between the user interfaces 106 and 107, and interactions between agent results and the user interfaces (e.g., to display the recommended changes associated with an LLM output on the canvas 107).

Figure 2:
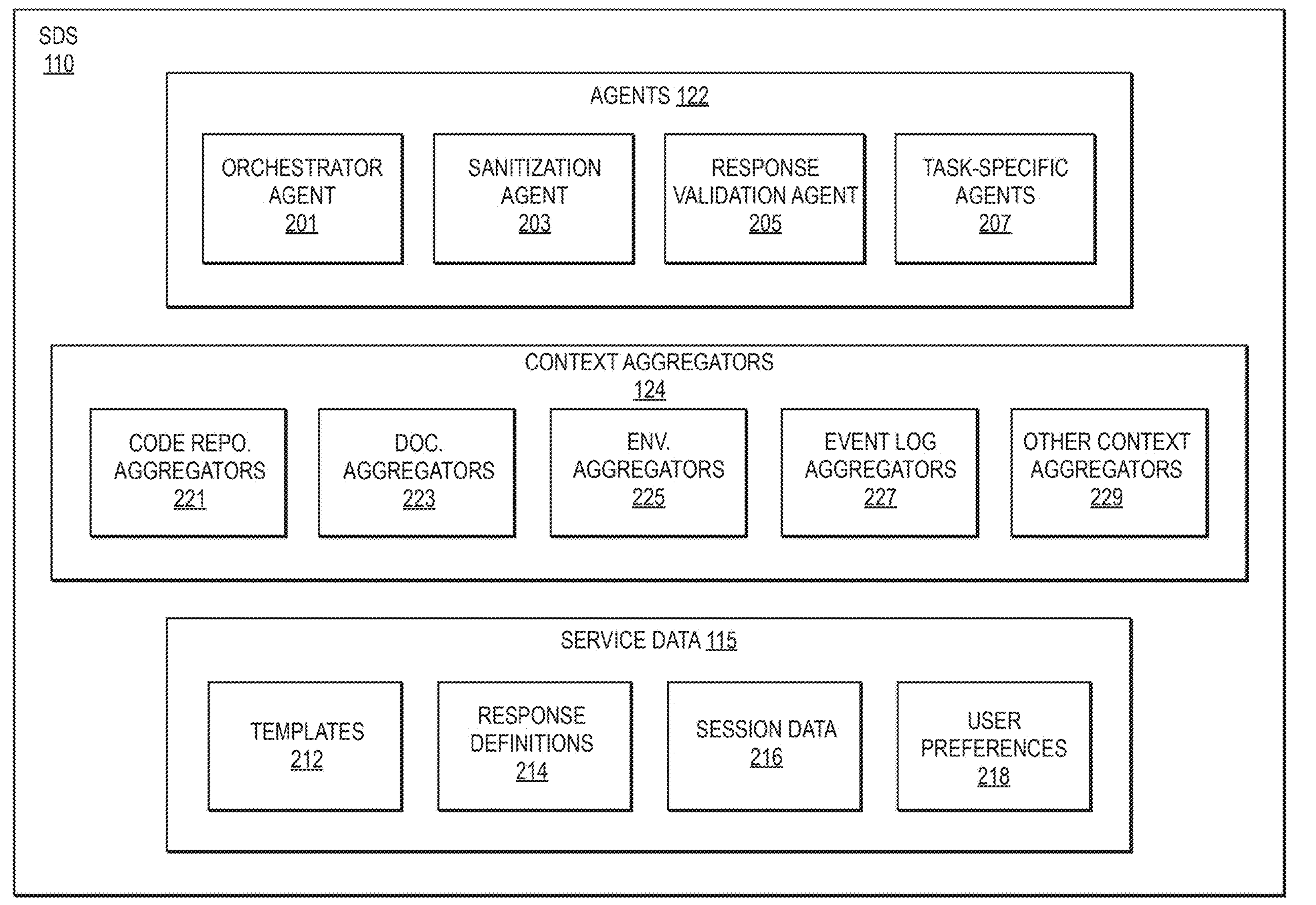
FIG. 2 depicts additional details of a software development service according to some examples.

FIG. 2 depicts additional details of a software development service ("SDS") according to some examples. Agents 122 include various task-specific agents 207 as well as other general agents that support SDS interactions with an LLM 199. Example general agents include an orchestrator agent 201 that can manage a session with a client, a sanitization agent 203 that can ensure prompts and responses are within the scope of various tasks or do not venture into sensitive or objectionable material, and a response validation agent 205 that can evaluate LLM responses against expected results. For example, the response validation agent may validate that the content of the response is not objectionable (e.g., does not include profanity), is not copyright protected, etc.

In some examples, the orchestrator agent 201 can be the default agent executed upon connection by an application to the SDS 110 with a chat-based interface. Depending on the initial user prompt, the orchestrator agent 201 can identify the task requested to be performed and invoke the associated task-specific agent. The orchestrator agent 201 may leverage an LLM to determine whether a given prompt falls within a supported set of tasks and to identify which task-specific agent should be invoked.

In some examples, the sanitization agent 203 reduces the likelihood of the LLM providing objectionable or off-topic responses. Such responses may be artifacts of the LLM operations, resulting in what are sometimes referred to as "hallucinations." Having received a response, a sanitization agent can prompt the LLM (or another LLM, or another instance of the LLM without a saved context) with questions related to the nature of the response, such as to test whether the response contains objectionable material, whether the response is related to the expected field of use (e.g., software development, error resolutions, etc.).

In some examples, the response validation agent 205 (or "validation agent") verifies that an LLM response conforms with the response definition of the preceding prompt. The response validation agent can perform a variety of validations. Example validations include prompting the LLM (or another LLM, or another instance of the LLM without a saved context) with a question as to whether the received response conforms with the response definition of the previous prompt, testing whether the downstream software that processes the response can successfully parse it (e.g., parsing the response in a try-catch statement), and, in the case of code, executing the code in an isolated environment such as a sandbox. For example, a potential error solution provided by an LLM may be combined with code to generate a modified code and the modified code and executed in a sandbox environment to determine if the errors resulting in the modified code correspond to expected errors provided by the LLM that are expected to result with implementation of the potential error solution, as discussed further below.

Example task-specific agents 207 include agents that assist clients with a given task. For example, a system design agent can assist a client in gathering additional information to provide to the LLM to improve the LLM's response to a software development task, a development task agent can assist a client dividing a development task into sub-tasks or actions. An error resolution agent may automatically debug and resolve errors on behalf of the user and/or determine an efficient resolution to eliminate errors and provide guidance to the user. In some examples, the interface 111 of FIG. 1 can support requests that invoke a particular task-specific agent without relying on the orchestrator agent 201. For example, one API call can invoke the system design agent, another can invoke the development task agent, and another can invoke the error resolution agent.

Context aggregators 124 gather context about a given software system's environment to be provided to an LLM as part of the prompt expansion operations of the SDS 110. Such additional data can range from general documentation applicable to a prompt to specific source code associated with a given component of the software system. Agents 122 can invoke context aggregators, in some cases depending on a previous response from an LLM identifying which additional context would assist it in generating a response. Using the information obtained from the invoked context aggregator(s), agents 122 can provide at least some of that information as additional context in subsequent prompts sent to the LLM.

Some context aggregators 124 can retrieve information from other cloud-hosted services of a provider network or other reachable sources (e.g., sources with public facing APIs external to the provider network). One example of such information is source code and configuration data, which can provide relevant context to an LLM. Another service 194 of the provider network 100 may be a code repository service that stores source code, documentation, and other configuration data in repositories for various client applications. A code repository aggregator 221 can access the code repository service to obtain source code and/or configuration data associated with various components of an identified software system.

In some examples, context aggregators retrieve information about a particular software system. Such may be the case when a client of the SDS 110 has engaged it for a task associated with an existing system. The client can provide references to the various cloud-hosted services that include details about the system to the SDS 110, and the context aggregators can retrieve that data. In other examples, context aggregators retrieve information about other software systems owned by or otherwise accessible to a principal-typically the identity that was used to authenticate a client. The principal may be a user, group of users, organizational unit within a business, etc. The SDS 110 can leverage context aggregators to retrieve details about the other systems of the principal.

Often environmental parameters can have an effect on software program operations. Such environmental parameters can extend from the particulars of the operating system environment variables in which the application is running to the overall cloud-based environment, the latter particularly so when the application is hosted in a provider network. For example, another service 194 of the provider network 100 may be a permissions service (e.g., an identity and access management service). Such a permissions service can include policies that define the various actions that principals can take or that various actions that can be taken upon hosted resources, thus impacting application execution. An environment aggregator 225 can access the permissions service to obtain permissions data associated with an identified software program.

Logged events and/or errors can also provide context regarding a development task, particularly when troubleshooting bugs or other errors. Another service 194 of the provider network 100 may be a logging service in which events, errors, and other types of activity related to applications executing in the cloud are recorded. An event log aggregator 227 can access the logging service to obtain logs associated with an identified software system.

General documentation related to a service or API can also provide useful context without being specifically associated with a particular application or user. Other types of more specific documentation can also be helpful. Such documentation can include software project descriptions, software documentation, source code files, ticketing systems, and the like from other public software programs or systems. Another service 194 of the provider network 100 may be a documentation service that stores such documentation. A documentation aggregator 223 can use Retrieval Augmented Generation (RAG) techniques to identify documents of "relevance" to a given task. Initially, each of the available documents with the documentation service can be encoded as an embedding, such as by the vector embedding service 193, and those embeddings stored in a database. When invoked, the documentation aggregator 223 can use the encoder to generate an embedding from user text for the given task or query. The document aggregator 223 can then identify relevant documents based on the distance between the task/query embedding and document embeddings in the database, selecting the N nearest document embeddings, document embeddings within some distance threshold, or some other criteria to identify documents having embeddings in proximity to the task/query embedding. The documentation aggregator 223 can then access the documentation service to obtain the documents associated with those selected embeddings.

Additionally, as discussed further herein, document segments may be encoded into embeddings and clusters of embeddings determined and processed to identify similar document segments from different documents. Those document segments may then be further processed, for example by one or more generative AI models, to determine if the content of those segments is the same, conflicting, and/or whether one segment encompasses another. Further processing may then be performed to align the content of those segments, generate a canonical document segment for those segments, and link the segments of the cluster to the canonical document segment, thereby ensuring that a user receives the most up-to-date and accurate information when documents are provided to the user.

Other context aggregators 229 may generate annotated context from data obtained by other context aggregators. For example, some context aggregators can compile and annotate data retrieved by other aggregators into a summary. Such a context aggregator can indicate, for each of the other context aggregators that retrieved data or other information, a description of the source of the information. As another example, some context aggregators may generate structural summaries of a software system. Cloud-hosted software systems are often structured as a collection of interacting services with user code running on various resources to coordinate those interactions. A system map (or "architectural map" or just "map") can describe the structure of a software system. The structure can include details like programs, the cloud-level infrastructure or resources on which those programs are executed, the interconnection of those programs through various data transfers (e.g., API calls, passing JSON objects, etc.), environmental configuration data (e.g., environment variables available to the programs, variables that configure the resources on which programs execute, etc.), network-level configuration data (e.g., VPC configuration data, configuration data of virtual network components like routers or gateways, etc.). In some examples, a system map of the structure of a software system may have been previously defined (e.g., by the developer). In other examples, a system map context aggregator can generate a system map that provides a description of the software system. Additional details on the system map context aggregator are illustrated and described with reference to FIG. 3.

Service data 115 can include templates 212, response definitions 214, session data 216, and user preferences 218. Templates 212 can include templates that provide additional text cues beyond what might otherwise be provided by a user. For example, a user might provide a prompt such as "what is causing error X?" A prompt template can encapsulate the user's prompt with various cues that improve the quality of the response of the LLM. One pattern used by agents associated with various tasks described herein is a template to prompt the LLM to ask questions (e.g., "You will be asked to respond to the following prompt: 'what is causing error X?' What information would assist you in your response?"). Prompt templates can be used to expand prompts received from various clients (a human user typing a software error into an issue tracking system that later submits an API call to the SDS is likely to use the same abbreviated language as a human user typing an error into a chat session with an LLM). Templates 212 can also include response templates for responses to be sent to clients, populated with data received from the LLM and/or actions taken by the SDS (e.g., resolution of errors in code). In some implementations, the response templates may be generated dynamically to include different components that may be determined useful in presenting a response to a user. For example, the prompt and/or the response from an AI system may be processed to determine components, such as graphical representations, links, document segments, etc., that are relevant to and/or supplement the response.

Response definitions 214 define how the SDS 110 will expect the response from the LLM to be formatted. Response definitions 214 can be used to regularize the responses from LLMs to improve the ability of the SDS 110 to parse those responses such that they can be stored, trigger follow on actions, etc. Example response definitions include instructing the LLM to respond in natural language forms such as with a Yes or No, a list of items, an enumerated list of items, etc. and also to respond with more structured forms (e.g., with Python code, with an SQL query, with a JSON object, etc.). Note that the interpretation of responses pursuant to response definitions is typically contingent on the phrasing of a prompt, tailored within a given agent (e.g., a negative response might indicate a pass for one prompt, a failure for another).

Session data 216 can include the historical dialogue with an LLM, as mediated by the SDS. Not all prompts that the SDS 110 submits to an LLM 199 originate from a client, nor does the SDS 110 send all responses from the LLM 199 to the client. For this reason, the session data can include metadata about LLM interactions (e.g., whether a prompt originated from the SDS 110 or a client, whether a response from the LLM was sent to a client). For example, while a client may submit a prompt of "can you fix error X?," the SDS may send a prompt to the LLM of "please provide one or more potential solutions to resolve error X."

User preferences 218 can include stored user preferences based on prior dialogs with a client. In particular, the system design agent can elicit information from the client regarding preferences. Such preferences can include things such as preferred programming language (e.g., to instruct the LLM when requesting code suggestions), preferred compute options for cloud-hosted applications (e.g., whether a virtual machine, container, serverless function, etc.), permissions preferences (e.g., whether a certain set of principals can access the application), etc.

While not shown, the service data 115 can include other data such as the types of tasks the SDS 110 can support (typically those associated with the available task-specific agents) as well as the types of additional information or context that can be gathered (typically associated with the available context aggregators).

Figure 3:
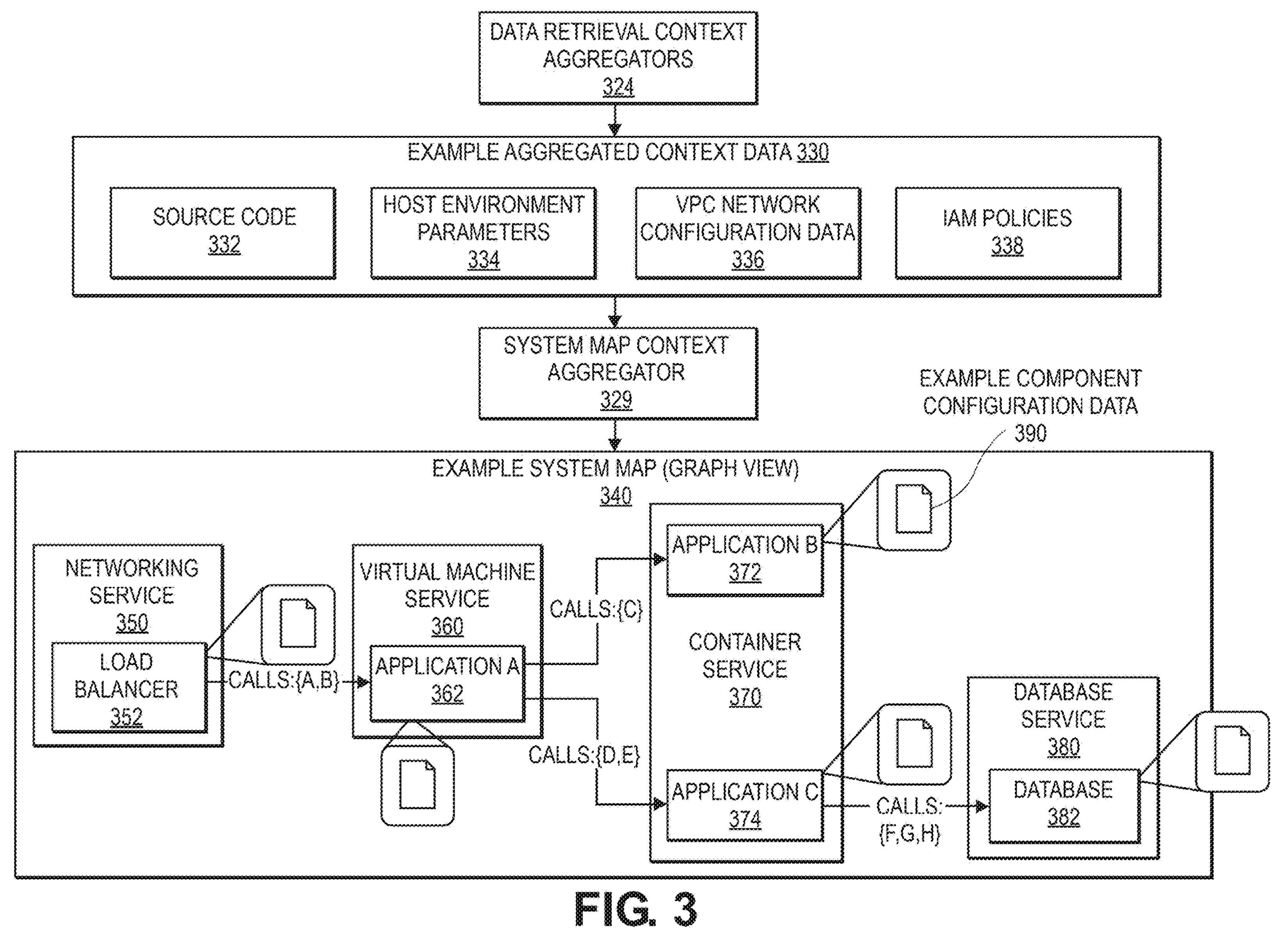
FIG. 3 depicts details of a system map context aggregator according to some examples.

FIG. 3 depicts additional details of a system map context aggregator according to some examples. A system map context aggregator 329 can analyze example aggregated context data 330, such as source code 332, host environment parameters 334, VPC network configuration data 336, IAM policies 338, etc., collected by various data retrieval context aggregators 324 (e.g., aggregators 221, 223, 225, 227, etc.) to identify components of a software system as well as the dependencies amongst those components. The system map context aggregator 429 can generate a system map 340, typically specified in a structured language format describing the components such as resources (e.g., networking service 350, virtual machine service 360, container service 370, database service 380) and mappings between resources. Common formats for the map include JSON, YAML, UML, etc. In an example map, each component can include an identification and description of the APIs it vends as well as an identification of the APIs it calls. Thus, a component vending an API "product_order( )" would be a dependency to other components making calls to that API. The components can further include or reference the network policies that control the types of traffic that can be sent to or from the component. For components executed by a resource (e.g., containers, virtual machines, serverless functions, etc.), the map can include or reference the environmental parameters associated with an instance of that component. For data sources and sinks, the components can include a description of their formats (e.g., a schema for databases hosted by a database service).

An example graphical view of a system map 340 is illustrated. Components 352, 362, 372, 374, 382 are interconnected via API calls A through H as shown. Each component has an association with a service of the cloud provider network—for example the database 382 is hosted by a database service 380 of the provider network (e.g., another service 194). Each component also has component configuration data 390, such as permissions policies, network policies, environmental configuration data, etc.

Figure 4:
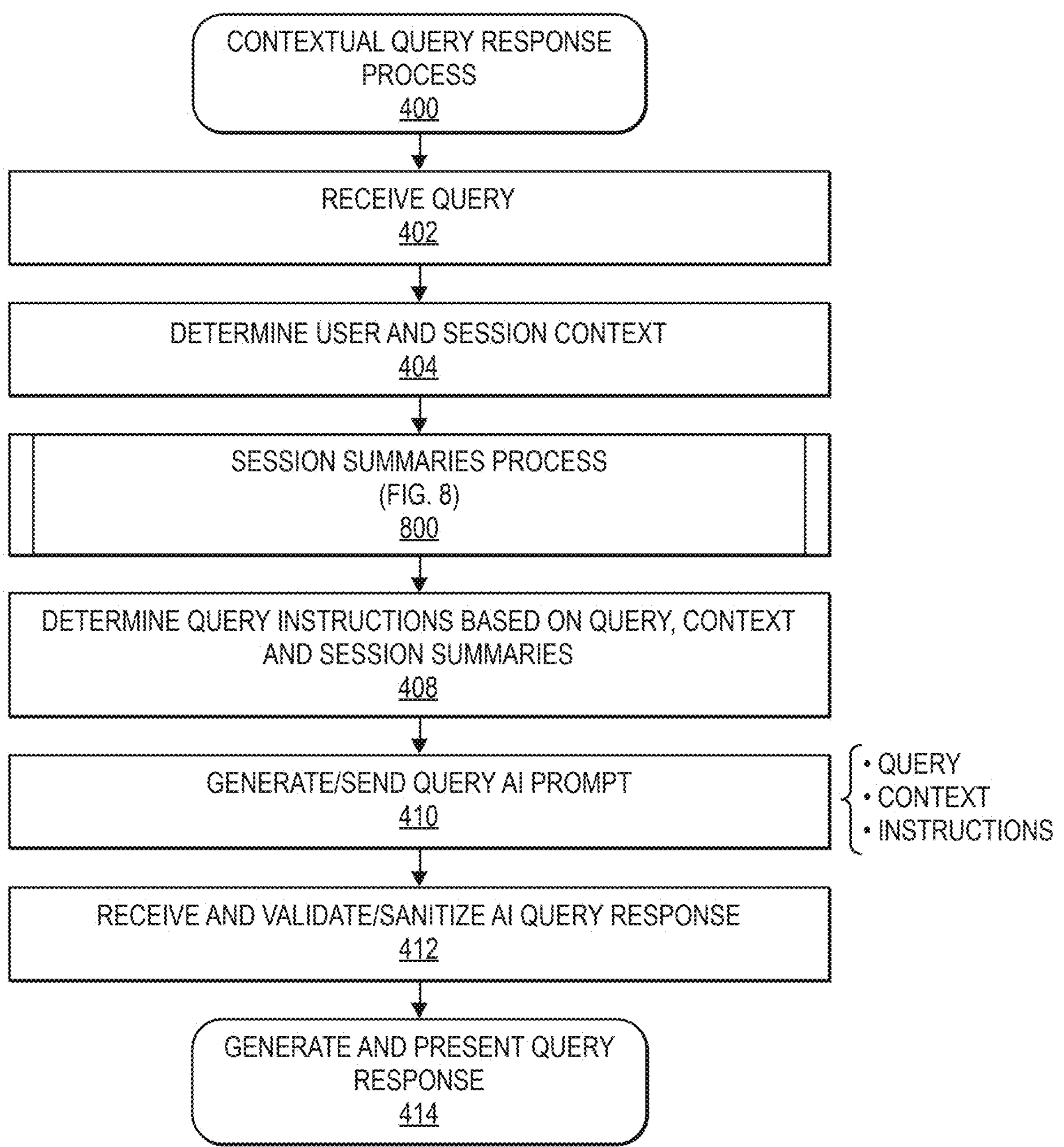
FIG. 4 is an example contextual query response process, in accordance with implementations of the present disclosure.

FIG. 4 is an example contextual query response process 400, in accordance with implementations of the present disclosure.

Figure 6:
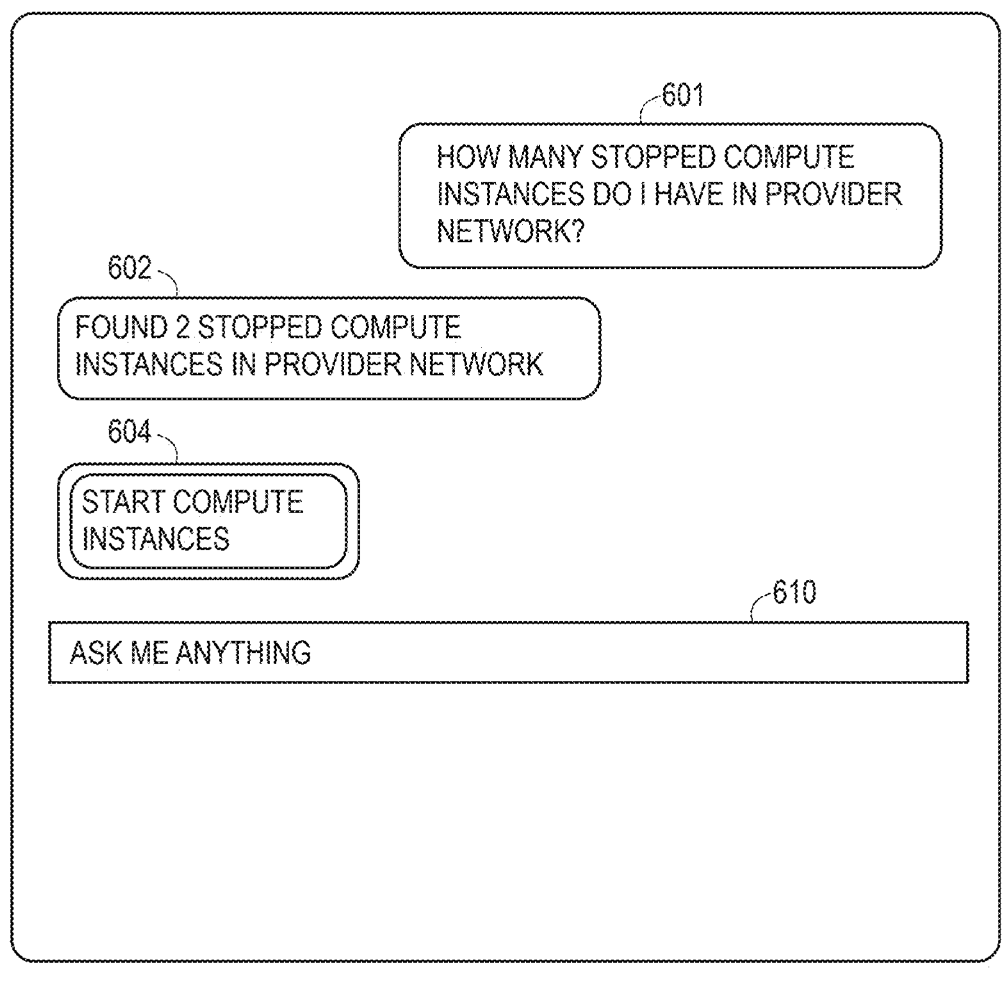
FIG. 6 is an example contextual query response user interface, in accordance with implementations of the present disclosure.

The example process 400 begins upon receipt of a query, as in 402. In some implementations, the query may be a direct query from a user via an interface, such as the chat-interface discussed above. For example, and referring to FIG. 6, illustrated is an example query response user interface 600. In the illustrated example, the user has submitted a query of "How many stopped compute instances do I have in provider network?" 601. In other implementations, the query presented to the example process 400 may be a query determined by other components of the disclosed implementations to proactively generate and provide content to a user, without the user having to submit a query.

Returning to FIG. 4, in response to receiving a query, user and session context may be determined, as in 404. User information may be determined based on user credentials received or submitted by the user when the user accesses the interface (e.g., user identifier, etc.) and based on a user profile of the user. The session context may include, for example, the resources accessed by the user during the current session, the actions taken by the user during the current session, a location of the user device, a device type of the user device, the time of day, the day of week, etc.

Utilizing the query, along with the user and session context, the session summaries process 800 is performed, as discussed further below with respect to FIG. 8. As discussed below, the session summaries process may determine and return both session summary and a long-term summary.

Based on the query, user and session context, the session summary, and the long-term summary, query instructions are generated for an AI system, such as an LLM, as in 408. The query instructions may include, for example, specific instructions that are to be sent to an AI system along with guidance on how the AI system is expected to respond to the query. Continuing with the above example, the user and session context, along with the session summary and long-term summary, may be used to determine that the compute instances for which the user is referring are all hosted in a particular region (e.g., US-east) of multiple regions supported by the provider network. In such an example, the query may be expanded or the instructions may be defined to instruct the LLM to identify compute instances associated with the userID of the user, located in the particular region, and that are stopped. In addition, the instructions may further specify that the AI system is to determine and/or recommend actions with respect to the compute instances as part of the query response.

A query AI prompt may then be generated that includes the query/expanded query, the instructions, the determined context, and the generated instructions and that query AI prompt may then be sent to an AI system, such as an LLM, as in 410. After sending the query AI prompt to the AI system, an AI query response is received and validated/sanitized, as in 412. As discussed above with respect to FIG. 2, one or more components of the SDS, such as the sanitization agent 203 and/or the response validation agent 205, may process responses from the AI systems to confirm they are responsive to the query, do not include hallucinations, and are appropriate.

Finally, based on the AI query response, a query response is generated and presented to the user as responsive to the user query, as in 414. In some instances, when the AI query response includes code and/or other information for which one or more actions may be taken and/or for which a visual representation may be generated, the example process 400, as part of generating the query response, may generate the visual representation for the response, rather than just generating a text based response. Again, continuing with the above example, the AI system may determine and return, as part of the AI query response, an indication that the user has two stopped compute instances in the provider network. Such a response may include the specific references, links, and/or identifiers of the stopped compute instances. In addition, the AI query response may also include an actionable command that may be executed with respect to the determined stopped compute instances. For example, the AI query response may include the specific command instructions that, if executed, will cause the two identified compute instances to be restarted.

Rather than just present a textual response that includes the content of the AI query response, as is done in traditional systems, the example process 400 may further process the AI query response and generate/present both a textual query response and an action control that may be selected by the user to execute the action(s) included in the AI query response. For example, referring to FIG. 6 and the herein discussed example, the example process 400 may process the AI query response and provide a text query response 602 indicating that it "found 2 stopped compute instances in provider network," rather than identifying the specific compute instances. In addition, the example process may generate and present an action control 604 of "Start Compute Instances" that, if selected by the user via the interface 600, will cause the specific commands returned by the AI system to be executed such that the specifically identified stopped compute instances associated with the user are started.

Such a presentation removes many of the complexities of simply providing an AI system response to the user with all the details specified in the response and provides the user the ability to take recommended actions. In the illustrated example discussed with respect to FIG. 6, the user may simply select the action control 604 and cause the two stopped compute instances to be restarted and/or the user may submit another query through the query input 610.

Figure 5:
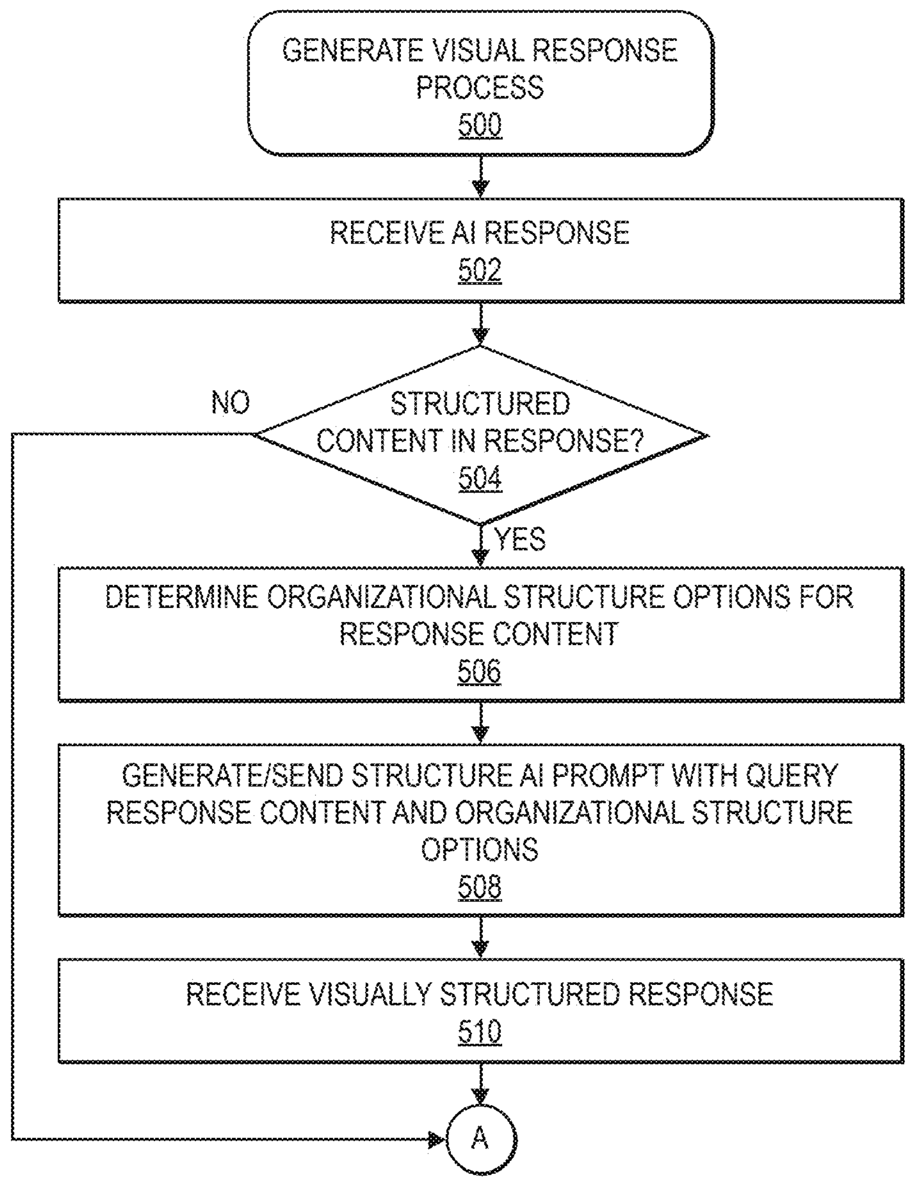
FIG. 5 is an example generate visual response process, in accordance with implementations of the present disclosure.
Figure 5:
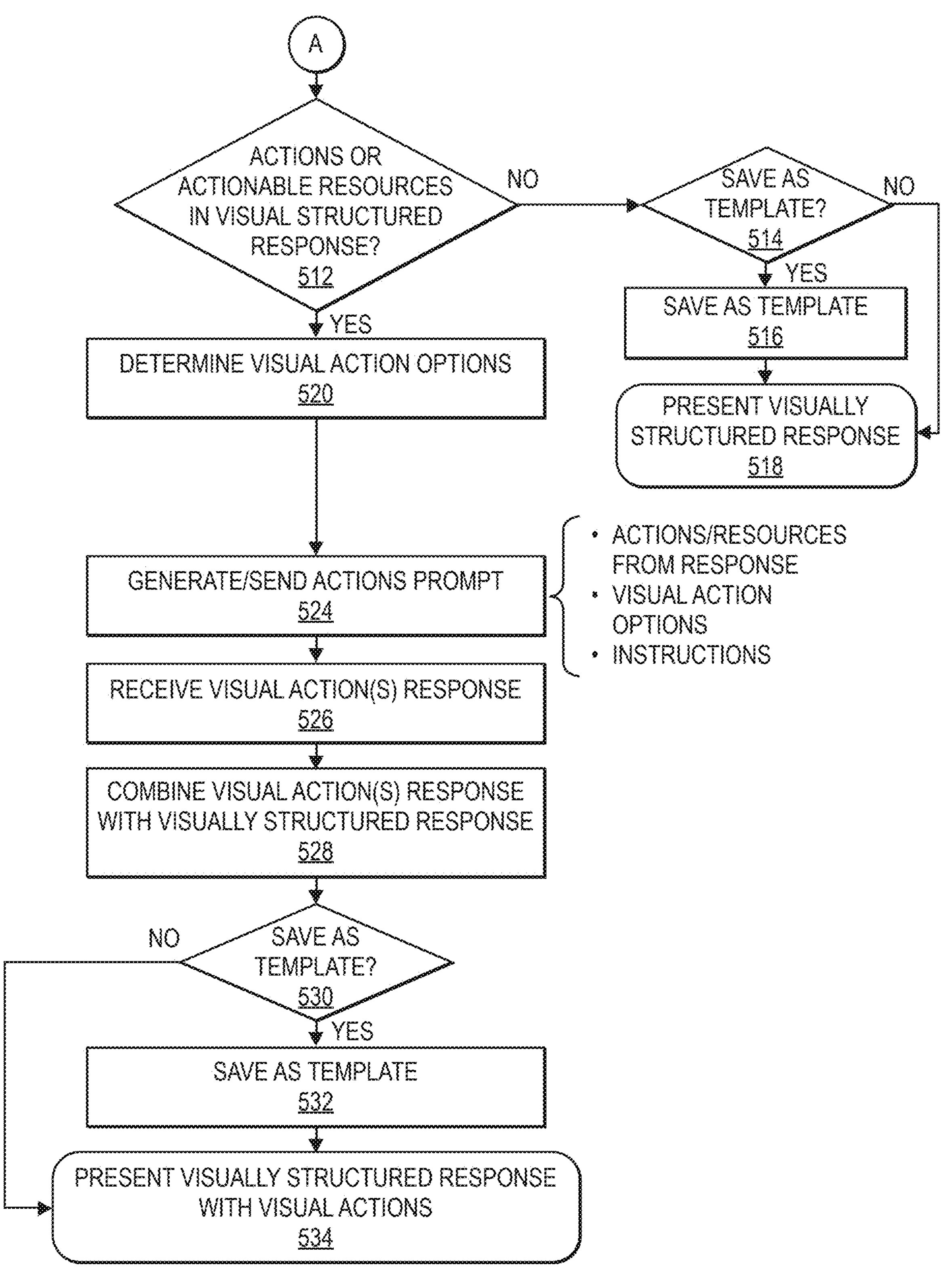

FIG. 5 is an example generate visual response process 500, in accordance with implementations of the present disclosure. The example process 500 provides additional details relating to the generation of a visual response, such as the visual response that included an action control discussed above with respect to FIGS. 4 and 6 and the visual responses illustrated and discussed herein with respect to FIGS. 7A and 7B.

The example process 500 begins with receipt of an AI response, as in 502. In some implementations, such as the example discussed with respect to FIG. 4, the AI response may be generated in response to a user query. In other examples, the AI response received by the example process 500 may be in response to an AI prompt generated and sent to an AI system by one or more other components of the provider network/SDS. For example, if a user journey is determined during a user session and a next best action recommendation is to be presented to the user, an AI query may be generated and submitted to the AI system requesting one or more next best actions that are to be generated and presented to the user.

Upon receipt of an AI response, a determination may be made if there is structured content included in the AI response, as in 504. Structured content may include, for example, a list, such as a list of compute instances, a series of instructions, etc. Generally described, structured content may be any content that is included in an AI response that is organized in a predictable manner, according to a defined pattern, etc., which may or may not include associated metadata.

If it is determined that the AI response includes structured content, one or more organizational structure options may be determined for the response content, as in 506. The one or more organizational structures may include, but is not limited to, a table structure, a bullet or checklist structure, a graph structure, a programming code layout structure, etc. In some implementations, a user preference or user history may be queried to determine or refine the options of organizational structure options for the AI response. For example, if different organizational structures have been presented to the user historically and the user generally engages with or indicates a preference toward one type of organizational structure over another, the user preferred organizational structure may be selected or prioritized over other potential organizational structures for the AI response.

Based on the one or more organizational structures determined for the AI response, a structure AI prompt may be generated and sent to the AI system that includes the structured content of the AI response, the one or more organizational structured content options, and instructions to provide a response that includes the structured content in accordance with one of the organizational structured content options, as in 508. For example, and referring to FIG. 7A an AI response to the query 710 of "List all of my stopped compute instances in provider network" may include structured content that lists all of the user's stopped compute instances by instance identifier along with the state of those compute instances, in this example stopped. In such an example, a structure AI prompt may be generated that includes the content of the prior AI query response, in this example the structured content indicating the compute instances and the state of those compute instances, along with one or more organizational structure options, such as table form.

Returning to FIG. 5, after sending the structure AI prompt to the AI system, the AI system returns a visually structured response, as in 510. In some examples, the visually structured response may include code, such as HTML code that defines how the content is to be rendered for presentation. In other implementations, the visually structured response may include an image or other indicator that may be presented as responsive to the query.

In the illustrated example 500, the visually structured response received at block 510 or, if it is determined at decision block 504 that the AI response received at block 502 does not include structured content, the AI response is processed to determine if there are any actions and/or actionable resources indicated in the visually structured response, as in 512. Actions may include any actions that may be performed with respect to a content and/or actionable resource indicated in the content of a structured response, such as a compute instance, storage instances, etc. For example and as discussed above with respect to FIGS. 4 and 6, compute instances indicated in a response may be considered actionable resources and/or an indication of an action, such as start compute instances, included in an AI response may be considered an action.

If it is determined that the visually structured response or the AI response does not include any actions or actionable resources, it may be determined whether to save the AI response or the structured AI response as a template, as in 514. As discussed above, templates may be generated and saved for later use when the same or similar queries are received by the SDS, from the same and/or different users and/or from the same or similar components of the SDS (e.g., next best actions recommendations component).

If it is determined that the AI response or the visually structured AI response is to be saved as a template, a template corresponding to the AI response/visually structured AI response is generated, as in 516. The template may include the visual structure and/or other metadata but remove any content that is specific to the user/query.

After generating the template or if it is determined at decision block 514 that a template is not to be generated, the visually structured response is presented, as in 518.

Figure 7A:
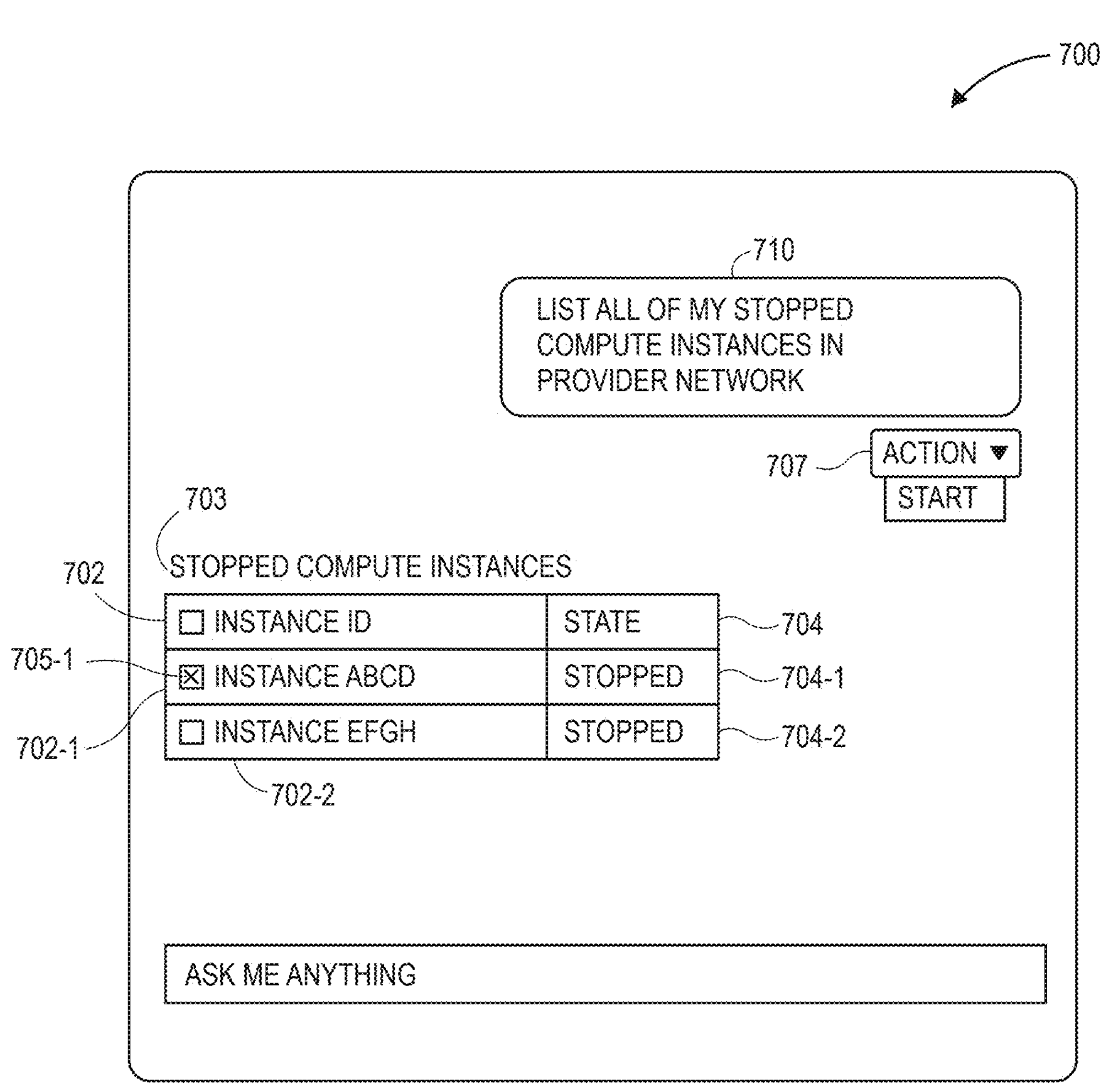
FIGS. 7A and 7B illustrate example visual response user interfaces, in accordance with implementations of the present disclosure.

Returning to decision block 512, if it is determined that there is an action and/or actionable resource included in the visually structured response, visual action options may be determined for each action or actionable resource of the AI response/structured AI response, as in 520. Visual action options may include any indicators, action controls, etc., that may be used to visually represent any specific action command and/or actionable resource command that is specific in an AI response/structured AI response to improve the presentation of the action and/or actionable resource when presented to a user. For example, and referring again briefly to FIG. 6, the action control 604 is a visual action option. Likewise, the action option 704 illustrated in FIG. 7A is another example of a visual action option. The action options may be selected based on the compatibility of the action option with the organizational structure for the response, user preferences, etc.

An actions AI prompt may then be generated and sent to the AI system, as in 524. The actions AI prompt may include an indication of the action(s) and/or actionable resources specific in the AI response/structured AI response, an indication of each visual action option that may be selected, instructions for the AI system to generate a visual actions response and specify how that visual action response is to be returned. For example, the instructions may specify that the visual action response is to be returned as code that will cause presentation of the visual action, as a visual representation, etc.

For example, if the user submits a query stating, "How do I create a spinner that will appear in the upper left corner of a user interface?," the example process may generate an instruction telling the AI system to generate code that, when executed, will cause the presentation of a spinner in the upper left corner of a user interface.

After sending the actions AI prompt to the AI system, a visual action(s) response is received, as in 526. In this example, the visual action(s) response is combined with the visually structured response, as in 528, so that the visually structured response and the actions corresponding to the content of the visually structured response can be presented together. While the example 500 discusses combining the two separate responses, in other implementations, the AI system may respond with a single response that includes both the visual structure for the content and visual actions that may be performed with respect to the content. Likewise, while the example process 500 discusses submitting two separate prompts to the AI system, one for the visually structured response and one for the visual actions response, in other implementations, the example process 500 may be revised so that a single request is sent to the AI systems requesting a response that includes both the visually structured content and the visual actions. Finally, the AI systems mentioned in FIGS. 4 and/or 5 may be the same or different AI systems.

After combining the visual actions response with the visually structured response, or if the AI system returns a single response that includes both the visual structure and the visual actions, it may be determined whether to save the response as a template, as in 530. As discussed above, templates may be generated and saved for later use when the same or similar queries are received by the SDS, from the same and/or different users and/or from the same or similar components of the SDS (e.g., next best actions recommendations component).

If it is determined that the response is to be saved as a template, a template corresponding to the visual structure of the response and the visual actions included in the response is generated, as in 532. The template may include the visual structure and/or other metadata but remove any content that is specific to the user/query.

After generating the template at decision block 532, or if it is determined at decision block 530 that a template is not to be generated, the visually structured response with the visual actions is presented, as in 534. Returning to the example interface 700 illustrated with respect to FIG. 7, in response to the query 710, "List all of my stopped compute instances in provider network," the example interface 700 generates and presents a visually structured response with visual actions 707 as responsive to the query. In the illustrated example, the selected visual structure is a table that includes the instance identifiers 702-1, 702-2 listed in an Instance ID column 702 of the table 703 and the state 704-1, 704-2 listed in a state column 704 of the table 703. In addition, the visual action is a drop-down 707 that, when selected, indicates the actions that may be performed by the user with respect to the actionable resources 702-1, 702-2 indicated in the table 703. In the illustrated example, the user may select a check box, such as check-box 705-1, as illustrated by the "X" and select the action control of "START" from the drop-down to cause the action of starting the compute instance to occur for the selected compute instance, in this example, compute instance 702-1, labeled "INSTANCE ABCD."

A visually structured presentation with action controls, such as discussed with respect to FIG. 6 and the example illustrated in FIG. 7A removes many of the complexities of simply providing an AI system response to the user with all the details specified in the response and provides the user the ability to take recommended actions with respect to one or more resources indicated in the presented content.

Figure 7B:
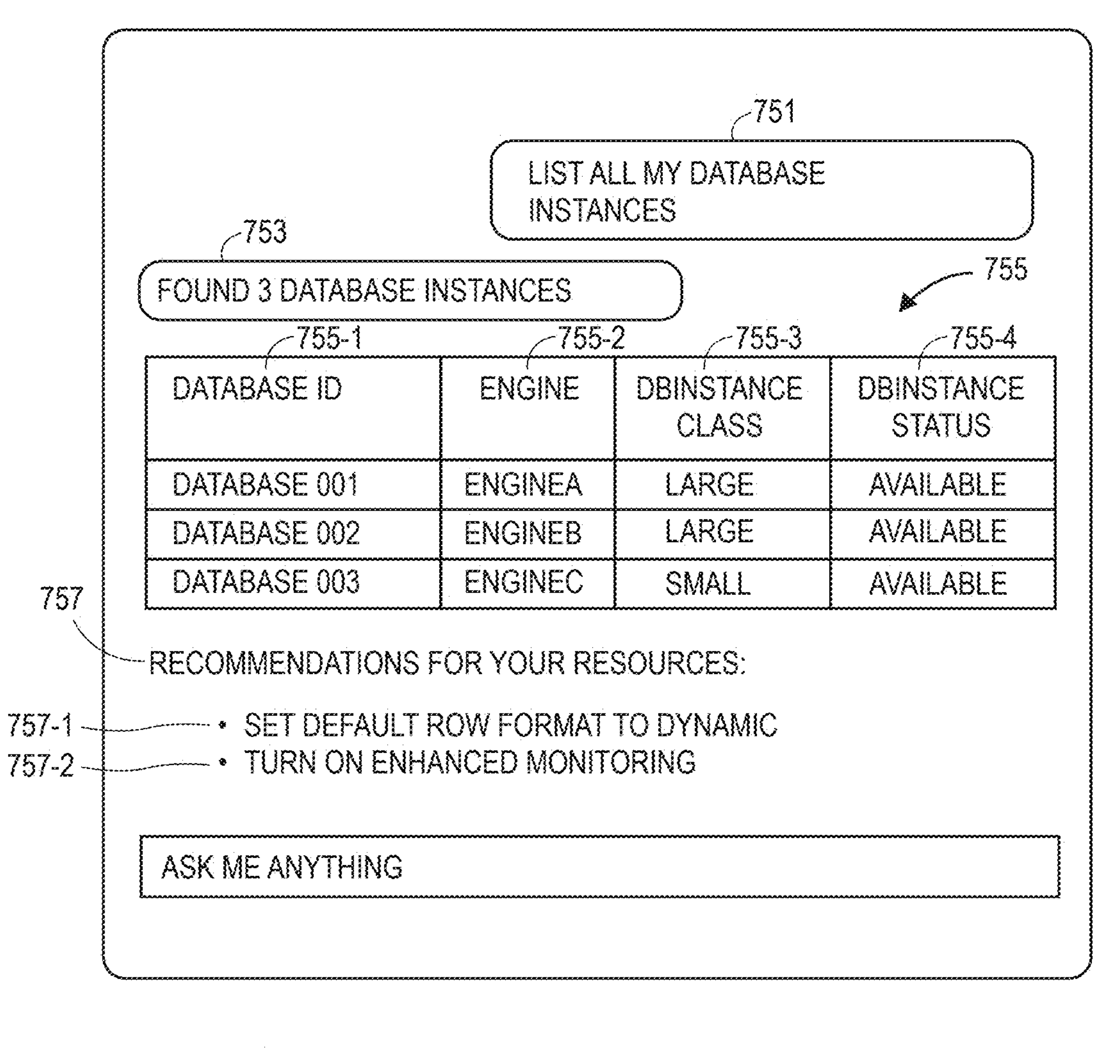

FIG. 7B is another example visual response user interface 750 that may be generated and presented in accordance with the disclosed implementations.

In the example discussed with respect to FIG. 7B, the user may submit a query of "List all my database instances." 751. Through the example process discussed with respect to FIGS. 4 and 5, and elsewhere herein, a visually structured response is presented to the user that includes a textual response 753 stating that the system "found 3 database instances," along with a visually structured response in the form of a table 755 that includes the database identifier 755-1 of each of the located databases, the engine 755-2 running each of the databases, the database instance classes 755-3 of each of the located databases, and the database instance status 755-4 of each of the located databases. As will be appreciated, any of a variety of structured information may be included in a visually structured response. In some implementations, the content included in a visually structured response may be determined based on, for example, user preferences, user context, session contents, user device, display type upon which the response is to be presented, user journey, etc.

In the example illustrated with respect to FIG. 7B, rather than just visually indicating actions that may be performed with respect to the actionable resources indicated in the user interface 750, a list of recommendations 757 for the resources may be listed indicating several different actions that may be performed with respect to one or more of the actionable resources. In the illustrated example, a first recommendation of "set default row format to dynamic" 757-1 and a second recommendation of "turn on enhanced monitoring" 757-2 is presented for possible selection by the user.

Figure 8:
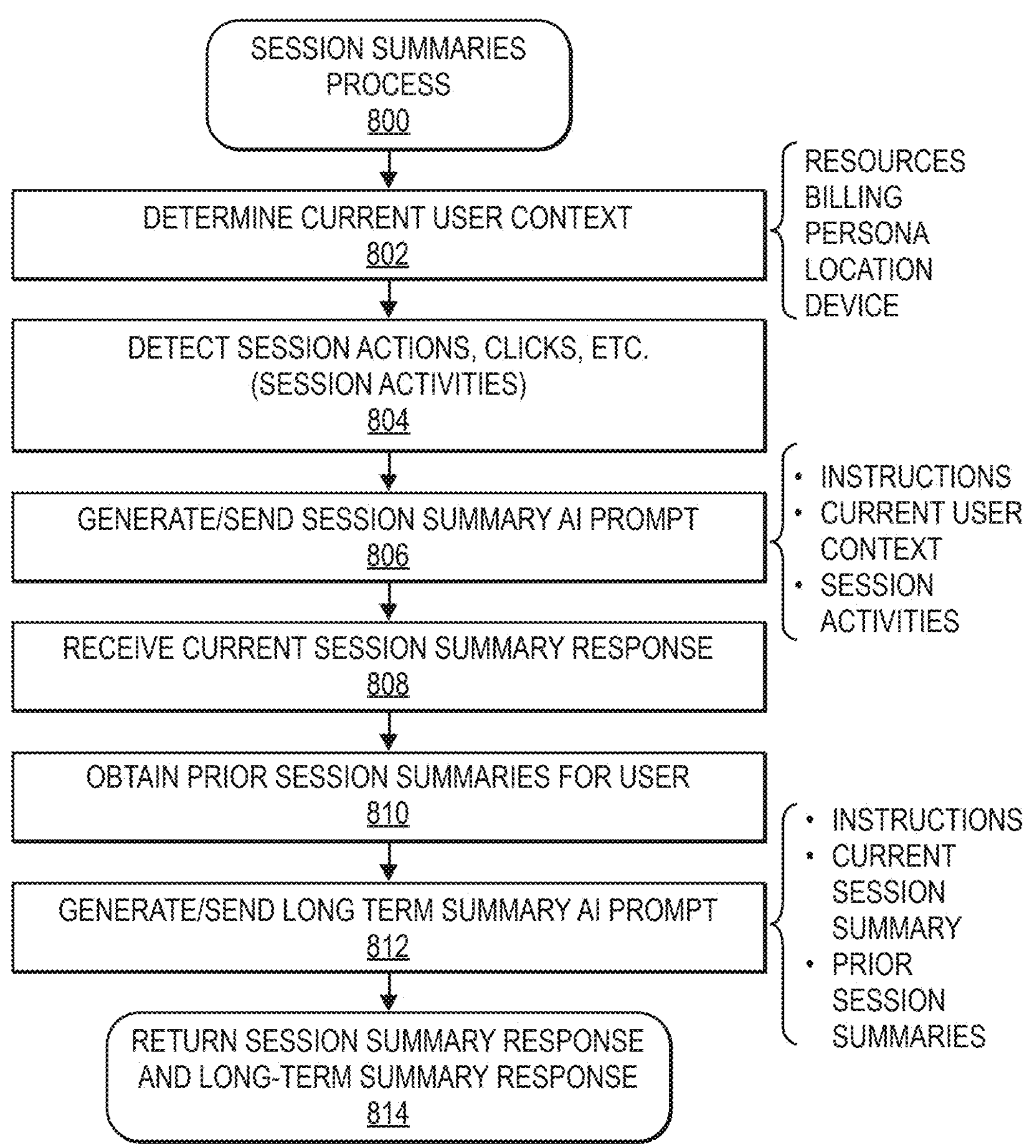
FIG. 8 is an example session summaries process, in accordance with implementations of the present disclosure.

FIG. 8 is an example session summaries process 800, in accordance with implementations of the present disclosure. The example process may be performed anytime during a user session. In some implementations, the example process may be performed each time a user performs an action during a session. In other examples, the example process 800 may be performed in response to one or more other components or processes requesting a session summary and/or a long-term summary for a user/session.

The example process 800 begins by determining a current user context of a user during a session, as in 802. Current user context, may include, but is not limited to, resources used by the user, billing, a persona (e.g., developer, administrator, editor, reviewer, etc.) selected by the user for the session, the location of the user, a device type used by the user, the time of day, the day of the week, etc. Likewise, session actions, clicks, instance initiations, instance terminations, etc., collectively "session activities," performed by the user during the session are also determined, as in 804.

Utilizing the current user context and session activities, the example process 800 generates and sends to the AI system a session summary AI prompt, as in 806. The session summary AI prompt includes the current user context and session activities, along with instructions for the AI system to generate a session summary that describes the current session in natural language based at least in part on the current user context and the session activities.

The AI system generates and returns a current session summary response for the session, as in 808. The example process, in some implementations, may also obtain prior session summaries stored for the user, as in 810, for use in generating or updating a long-term summary. In particular, upon receiving the session summary from the AI system and obtaining previously generated and stored prior session summaries, the example process 800 may generate a long-term summary AI prompt, as in 812. The long-term summary AI prompt may include the current session summary, some or all of the obtained prior session summaries for the user, and instructions that the AI system generate or update a long-term summary based on the current session summary and at least some of the prior session summaries.

In some implementations, multiple long-term session summaries may be generated for a user based on, for example, different user contexts and/or different session summaries. For example, the AI system may determine groups of session summaries that are most likely related to the current session summary (e.g., similar day(s)/time(s) of week, user location, device) and generate a first long-term summary based on just those session summaries and identify other session summaries (e.g., different user location, different day(s)/time(s) of the week) and generate a second long-term summary based on those session summaries. As one example, a first long-term summary may be generated for a user during times when the user is at work and doing work related activities and a second long-term summary generated for the user when the user is at home and not doing work related activities.

Finally, the current session summary and/or the long-term summary generated by the example process 800 may be returned and/or presented, as in 814.

Figure 9:
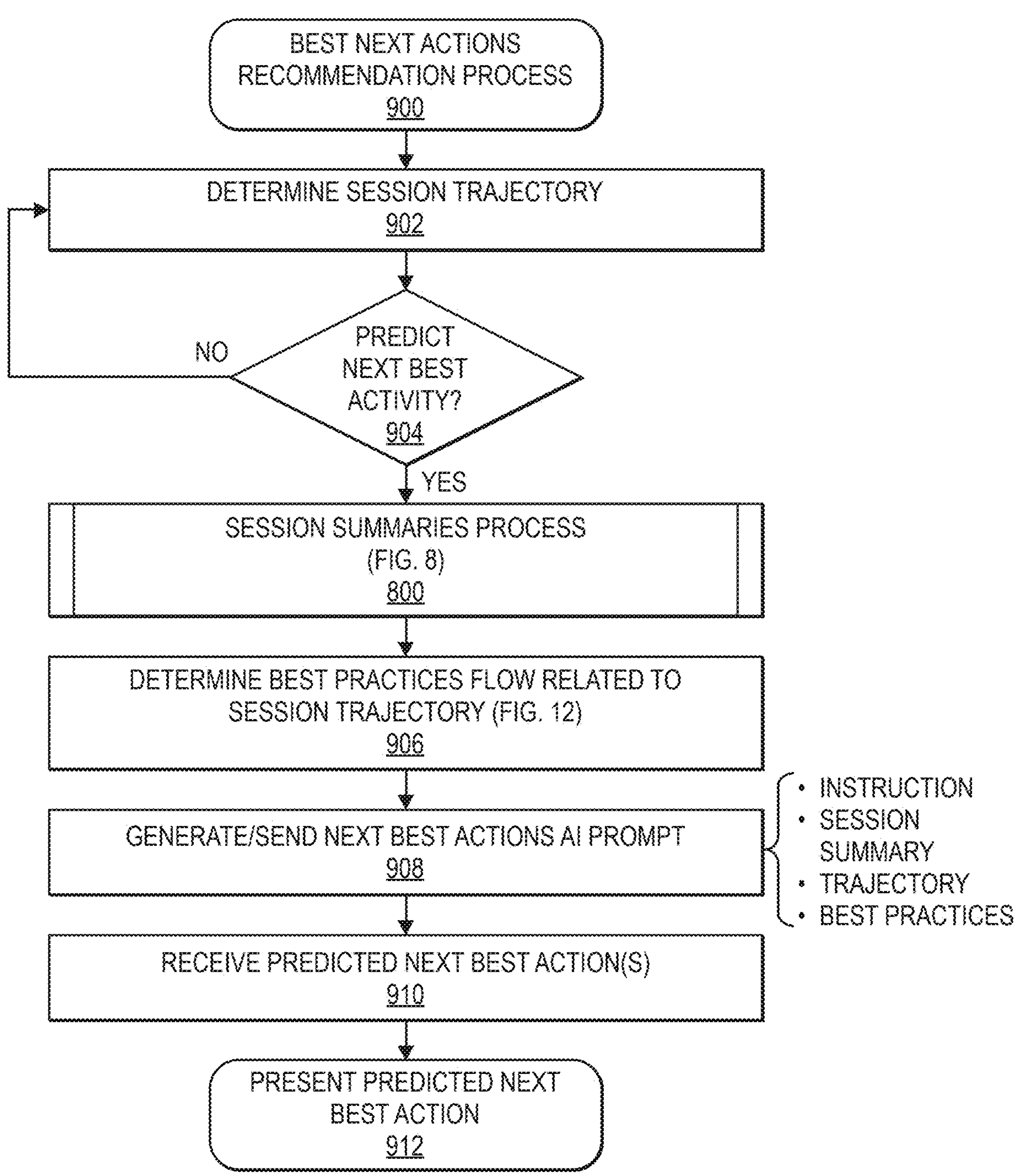
FIG. 9 is an example best next actions recommendations process, in accordance with implementations of the present disclosure.

FIG. 9 is an example best next actions recommendations process 900, in accordance with implementations of the present disclosure. The example process 900 may be performed periodically, in response to requests from other components or processes discussed herein, each time a user performs an action during a session, etc.

The example process 900 begins by determining a session trajectory for a user session, as in 902. In some implementations, a session trajectory may be determined based on a series of two or more user activities performed by a user during a session. In other examples, determining a session trajectory may require more than two user activities during a user session. In some examples, the number of user activities required to determine a session trajectory may be based on prior session trajectories of the user. For example, if the user frequently performs the same series of activities, the trajectory may be determined with fewer activities in a future session when the user begins performing that same series of activities again. In comparison, if the user is performing a series of activities that the user has not historically performed and that series of activities could relate to a large variety of trajectories, the example process 900 may require additional activities before the session trajectory is determined.

Upon determination of a session trajectory, it may be determined whether a next best action is to be predicted, as in 904. In some implementations, it may be determined whether to predict a next best action based on a confidence score indicating how confident the system is in the determination of the session trajectory. In some implementations, when a session trajectory is determined, a confidence score may be assigned to that session trajectory indicative of a confidence in the accuracy of the determined session trajectory. As another example, the next based action prediction may only be performed if a single session trajectory is determined. For example, if the example process determines, based on user activity during a session, that the trajectory could be one of three different trajectories, the example process may not determine a next best action prediction, unless the next best action prediction is a next best action in all of the potential trajectories. As discussed herein, a trajectory may be a determined flow or path from a current activity/start activity to a destination activity, such as launching a compute instance, establishing a database, refactoring code, etc. As will be appreciated, there may be numerous different steps or activities that may be performed as part of a flow to progress from a current activity/start activity to a destination activity. However, in some implementations, there may be a "best" or most efficient series of activities that, if performed in that order, are the recommended next best activities.

If it is determined that a next best activity is not to be predicted, the example process 900 returns to block 902 and continues. If it is determined that a next best activity is to be predicted, the session summaries process 800 (FIG. 8) may be performed to determine a current session summary and optionally a long-term summary. In addition, a best practices flow related to the session trajectory may also be determined, as in 906. A best practices determination process 1200 is discussed further below with respect to FIG. 12. However, in some instances it is possible that a best practices flow may not be determinable from the current session trajectory or there may be no existing best practices flow that includes the current session trajectory.

After obtaining a best practices flow, if one is available/determinable, a next best actions AI prompt may be generated that includes the best practices flow (if obtained), the session summary, and the trajectory, along with a request that the AI system predict a next best action(s), as in 908. The next best actions AI prompt may include the session summary determined by the example process, the session trajectory determined at block 902, the best practices determined for the trajectory, and instructions for the AI system to predict a next best action. In some implementations, other information about the session and/or the user may also be included in the next best actions AI prompt.

In response to the next best action AI prompt, a predicted next best action, or series of predicted next best actions for the determined trajectory is received, as in 910, and presented to the user, as in 912. In some implementations, the predicted next best action(s) may be presented to the user proactively, without specific request from the user, such as through a console block presented in the workspace of the user. In other implementations, the predicted next best actions may not be presented unless requested by the user. However, in some implementations, the predicted next best actions may be utilized by the provider network to begin performing or taking the steps necessary to perform those next best actions so that when the user actually requests the next best action(s) be performed, the system can quickly complete the request, thereby improving the perceived operation of the provider network and the operation of the computing systems.

In many cloud computing systems there is a plethora of documentation that is intended to guide and assist users with the numerous options, features, and services available through the system. However, as systems grow, are updated, and otherwise evolve, the document repository also grows, with older documents becoming out of date, document segments among different documents conflicting with one another, and some segments totally encompassing segments of other documents. As such, when a user searches a document corpus for particular content, there may be multiple instances of similar but sometimes conflicting content. Some systems try to remedy this problem by prioritizing newer documents and/or more recently modified documents over older documents. While helpful, it still results in multiple similar responses and still often surfaces conflicting documents. Still further, an older document in the corpus, which may be incorrect/partially incorrect, may be updated, thereby resulting in a more current date. With traditional systems, such a document may take priority over what would otherwise be more relevant/accurate documents.

Figure 10:
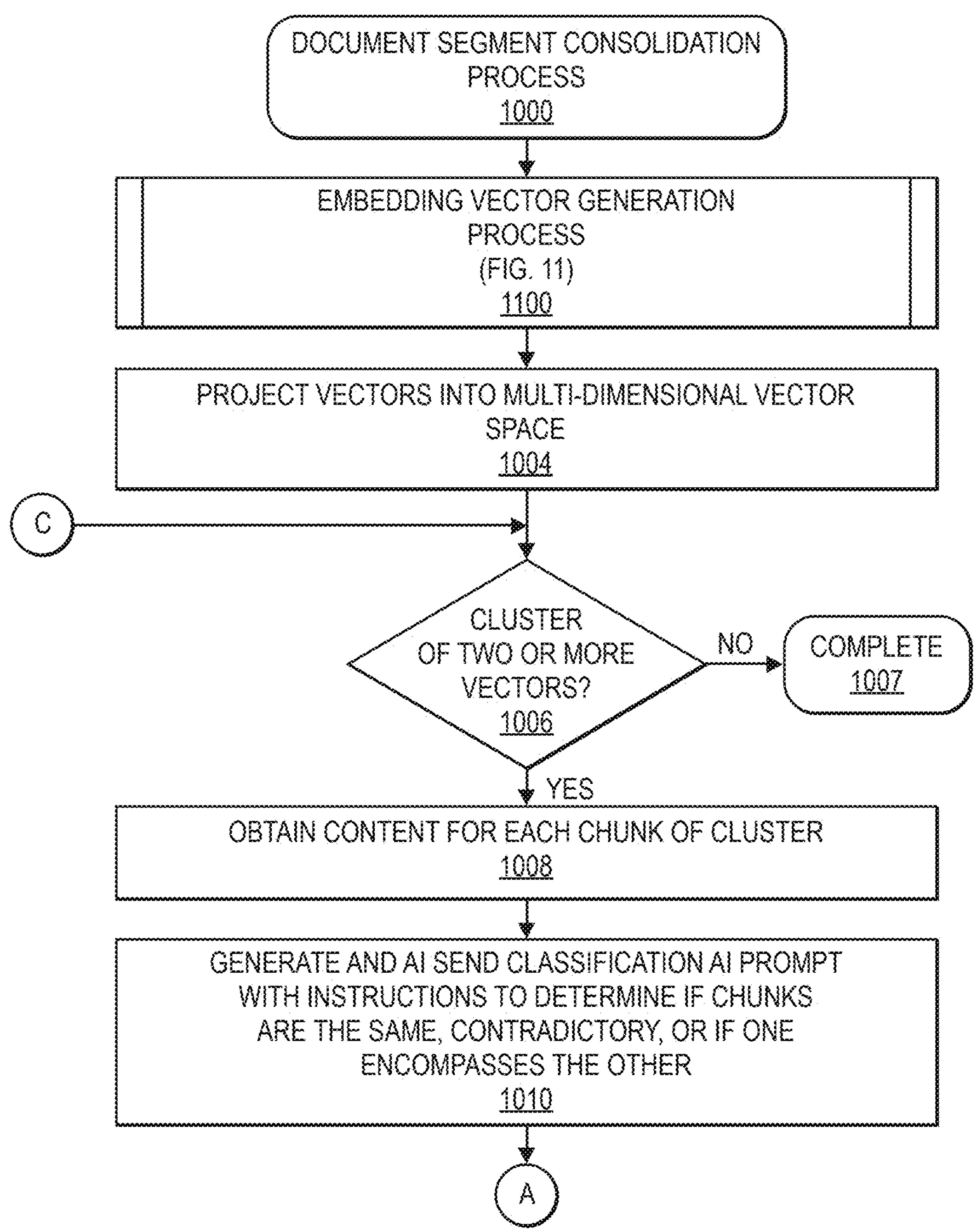
FIG. 10 is an example document segment consolidation process, in accordance with implementations of the present disclosure.
Figure 10:
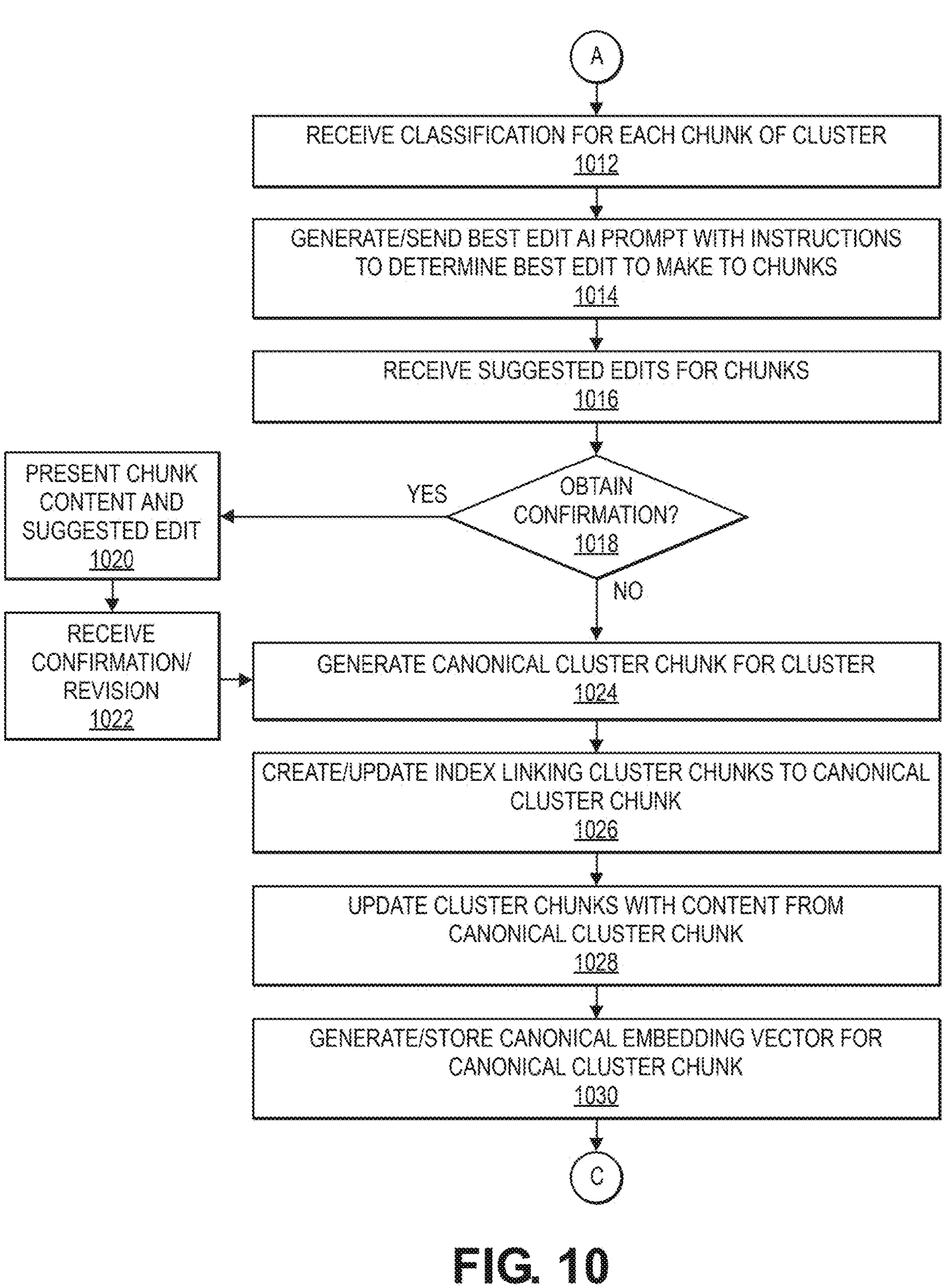

FIG. 10 is an example document segment consolidation process 1000, in accordance with implementations of the present disclosure. The example process 1000 may be performed on all documents of an existing corpus of documents to consolidate and align similar segments of numerous documents within a corpus and generate a canonical document segment for those documents. Alternatively, or in addition thereto, the example process 1000 may be performed on new documents that are generated and/or added to the corpus.

The example process 1000 begins by performing the embedding vector generation process 1100, discussed further below with respect to FIG. 11. The example process 1100 may be performed on multiple documents of a corpus and/or on a new document being generated or introduced into the corpus. When processing multiple documents of a corpus, each document may be segmented into chunks and embedding vectors generated for each of those chunks, as discussed below with respect to FIG. 11, and those embedding vectors projected into a multi-dimensional space, as in 1004. When a new document is added or introduced to the corpus, the new document may be segmented into chunks, embedding vectors generated for those chunks, and the embedding vectors of the new document projected into a multidimensional vector space along with the canonical embedding vectors that were previously generated for canonical cluster chunks generated by the example process 1000 when processing a group of documents.

Regardless of whether embedding vectors representative of multiple chunks of multiple documents are projected into the embedding space or if embedding vectors for chunks of one or more documents are projected into the embedding space along with canonical embedding vectors, a determination is made as to whether two or more embedding vectors are within a defined distance of each other in the vector space such that those two or more vectors form a cluster, as in 1006. For example, if the distance between two or more embedding vectors is less than a defined distance, those embedding vectors may be assigned to a chunk.

If it is determined that no two or more embedding vectors form a cluster, the example process 1000 completes, as in 1007. However, if two or more embeddings form a cluster, the content of the segment corresponding to each embedding of the cluster is obtained, as in 1008, and a classification AI prompt is generated and sent to the AI system to determine if the content of the clustered chunks are the same, contradictory, or if the content of one chunk encompasses the other, as in 1010. For example, the classification AI prompt may include the content of each chunk and instructions to the AI system to consider the content of each chunk to determine which chunks are the same, which chunks are contradictory, and/or which chunks encompass one or more other chunks.

The AI system, in accordance with the instructions, determines and returns a classification for each chunk, as in 1012. Upon receiving a classification for each chunk, a best edit AI prompt may be generated and sent to the AI system with instructions to determine the best edit to make to all the chunks of the cluster so that the chunks are accurate and consistent, as in 1014. The best edit AI prompt may include chunk content of some or all of the chunks, metadata (e.g., creation data, source, modification date, etc.) for each chunk, the determined classification for each chunk, and instructions to determine a best edit or content that is accurate and representative of all chunks of the cluster. In response, the AI system may send a single chunk of content that it generates based on the content of each chunk and the metadata of those chunks that the AI system determines to be accurate and representative of all of the chunks of the cluster, as in 1016.

A determination may then be made as to whether the suggested edit received from the AI system is to be confirmed, as in 1018. For example, a confidence score may also be returned with the suggested edit, the confirmation score indicative of a confidence that the suggested edit is accurate and accurately reflects each of the chunks of the cluster. If it is determined that the suggested edit is to be confirmed, the suggested edit and chunk content of some or all of the chunks of the cluster may be sent/presented for manual confirmation, as in 1020. For example, the suggested edits and chunk content of chunks of the cluster may be presented to one or more operators for confirmation that the suggested edit is accurate and properly represents the chunks of the cluster. In such an example, the operator/reviewer may either confirm the suggested edit and/or present revisions to the suggested edit such that the suggested edit becomes accurate and representative of the content of the chunks of the cluster, as in 1022.

After obtaining confirmation or revisions of the suggested edits at block 1022, or if it is determined at decision block 1018 that the suggested edit is not to be confirmed, a canonical cluster chunk for the cluster that includes the suggested edit as presented, confirmed, or revised, as the case may be, is generated, as in 1024. An index linking each chunk of the cluster may then be created or updated so that each chunk of the cluster is associated with the canonical cluster chunk, as in 1026. In addition, each cluster chunk of the cluster may be updated with the content of the canonical cluster chunk so that the content of each chunk of the cluster is accurate and consistent, as in 1028. A canonical embedding vector may also be generated and stored for the canonical cluster chunk, as in 1030. After generating the canonical embedding vector for the canonical cluster chunk, the example process 1000 returns to decision block 1006 and continues.

Figure 11:
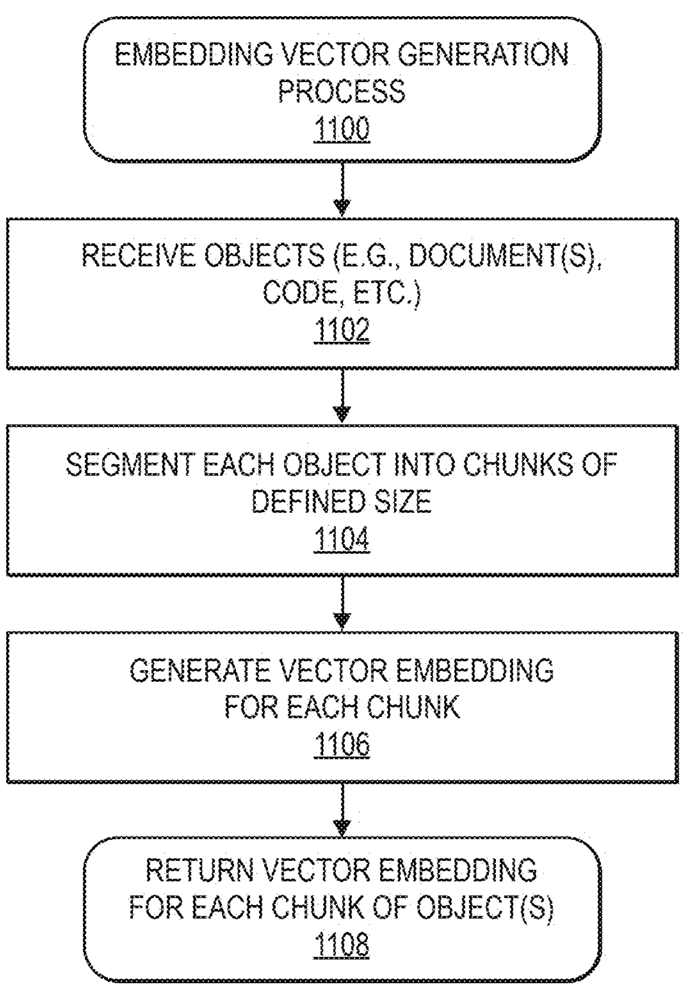
FIG. 11 is an example vector embedding generation process, according to implementations of the present disclosure.

FIG. 11 is an example vector embedding generation process 1100, according to implementations of the present disclosure.

The example process 1100 begins upon receipt of one or more objects, such as documents, code, etc., as in 1102. For example, as discussed above, in some implementations, the entire corpus of documents may be sent to the example process 1100. In other examples, a new document added or created for addition to a document corpus may be sent to the example process 1100.

Assuming the received objects are not already segmented into chunks of a defined size, each received object may be segmented into chunks of a defined size, as in 1104. The defined size may be any size, such as ten lines, fifty lines, seventy-five lines, or any other larger or smaller defined size. In other implementations, tokens may be generated for the content of the object and segment the object into chunks each having the same number of tokens (e.g., 256 tokens, 512 tokens, etc.). Accordingly, it will be appreciated that the disclosed implementations may use any of a variety of chunking techniques to segment objects (e.g., documents, code, etc.) into chunks. Likewise, while the disclosed implementations describe the use of fixed-size chunking to generate chunks for objects, in other implementations, other chunking techniques, such as content-aware chunking (e.g., sentence splitting, natural language processing, etc.), recursive chunking, specialized chunking (e.g., markdown, LaTex, etc.), semantic chunking, etc., may be utilized to generate chunks for objects.

Regardless of the technique used to generate chunks of each object, each of those chunks may then be processed, for example by the vector embedding service 193, to generate a multi-dimensional vector embedding representing the semantic meaning of the chunk, as in 1106. Accordingly, the vector embedding service 193 may generate a vector embedding for each chunk of each object. Likewise, an embedding index may be generated and maintained to preserve a relationship between each of the embeddings and positions of the chunks of those embeddings in the document.

Finally, the vector embeddings for each chunk are returned, as in 1108.

Figure 12:
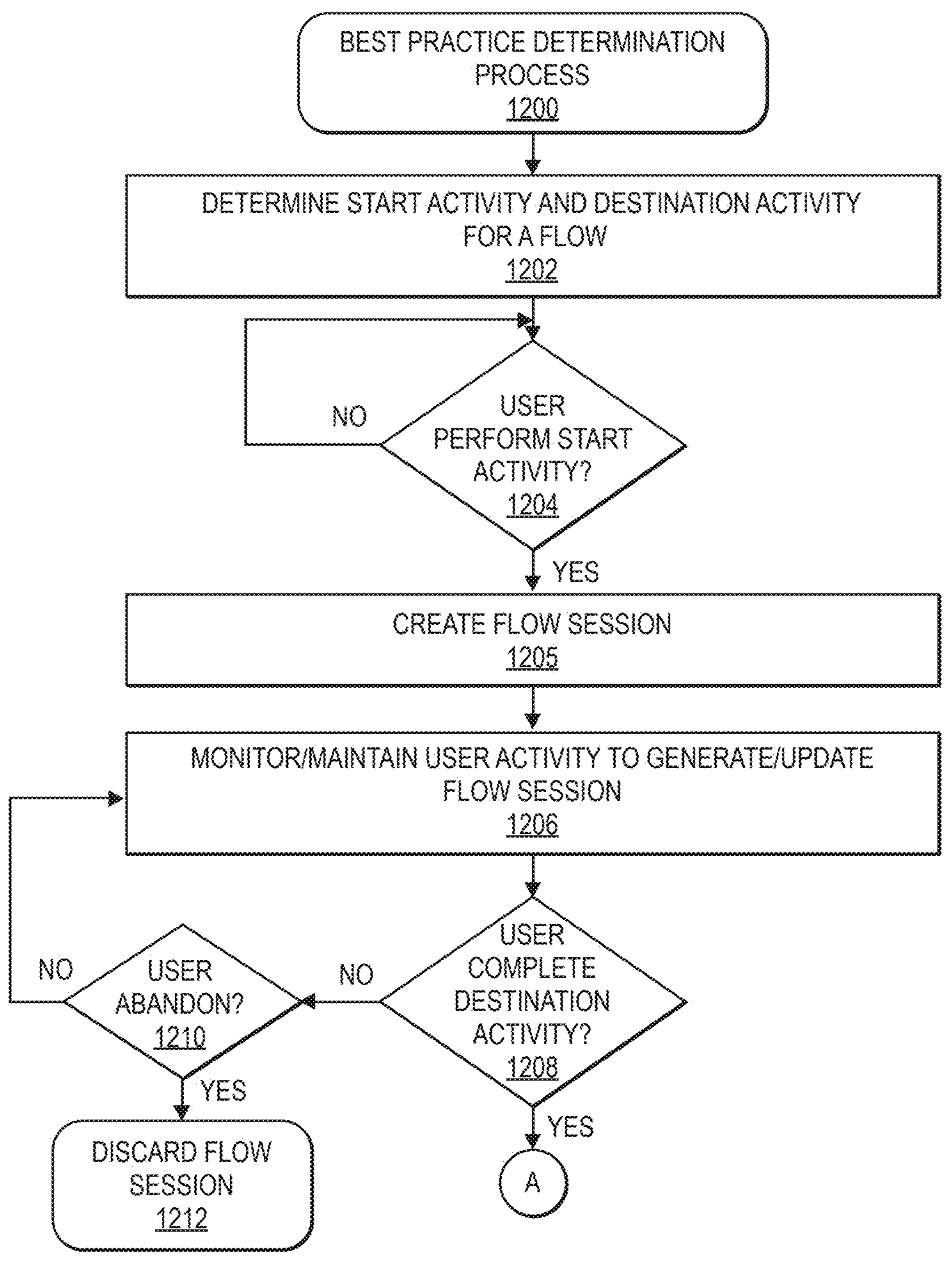
FIG. 12 is an example best practice determination process, in accordance with implementations of the present disclosure.
Figure 12:
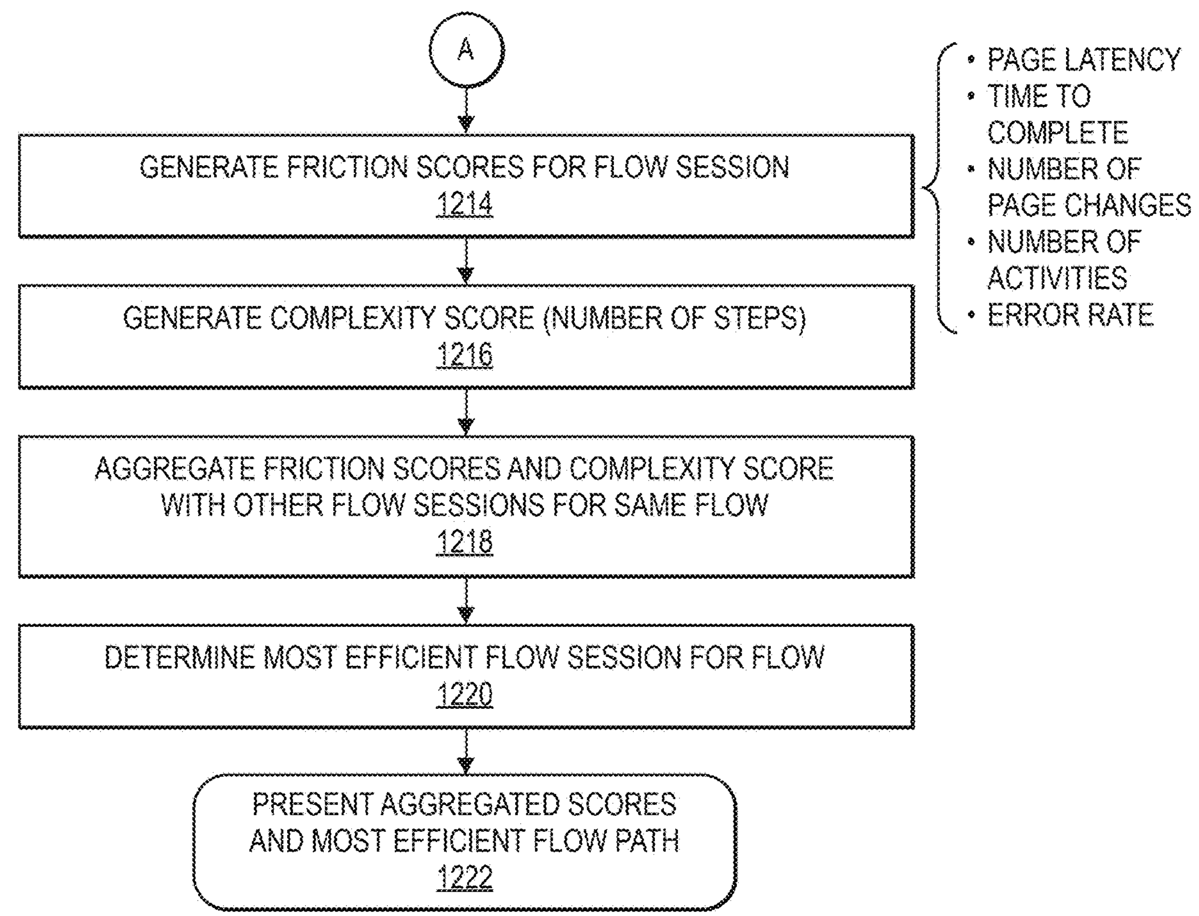

FIG. 12 is an example best practice determination process 1200, in accordance with implementations of the present disclosure. The example process 1200 may be performed periodically or continually to determine a best practice for progressing between a start activity and a destination activity.

The example process 1200 begins by determining a start activity and a destination activity for which the example process 1200 is to be performed, as in 1202. In some implementations, an operator may define a start activity and a destination activity. In other implementations, a start activity and destination activity may be determined organically, such as by aggregating the activities of multiple users of the provider network to determine common start activities and end activities during user sessions. For example, when a user selects to start a compute instance, the start activity may be that selection of the user to start a compute instance and/or the loading of an interface indicating the required and/or optional steps to perform successfully launch a compute instance. Likewise, the destination activity may be the successful launch of the compute instance or the selection of a final control to launch the activity and the user interface successfully confirming the launch of the compute instance.

Upon determination of a start activity and a destination activity, a determination may be made as to whether a user has completed the start activity for which the example process 1200 is to be performed, as in 1204. If it is determined that a user has not completed the start activity, the example process 1200 remains at decision block 1204 and awaits completion of a start activity. Upon determination that a user has completed the start activity, a user activity log representing a flow of the user is generated and an indication of the completion of the start activity is included in the user activity log, as in 1205. The user may continue to be monitored and each user activity performed by the user after the user has completed the start activity may be added to the user activity log, thereby representing a flow session of the user as the user progresses from the start activity, as in 1206. As will be appreciated, there may be essentially infinite combinations of different activities that a user may perform as the user progresses between a start activity and a destination activity.

In some implementations, the flow session and/or the optional or required steps of a flow session may be presented to the user as a form, which may be a single page form or a multi-page form. The presented form may indicate each of the optional and/or required steps to be completed as the user navigates from the start activity to the destination activity. If a step has multiple parts (e.g., completing multiple fields within that step) each of those parts may be considered sub-steps. As the user completes each of the steps of the form, as determined through a monitoring of the user's activity, the user activity log may be updated and the form updated to indicate the completion of each step/sub-step.

As the user activity is monitored, a determination is made as to whether the user has completed the destination activity, as in 1208. If it is determined that the user has not completed the destination activity, it may be determined whether the user has abandoned the flow session, as in 1210. Abandonment may be determined, for example, by the user terminating a session, a defined amount of inactivity, the user cancels a process corresponding to the flow or moves away from the flow (e.g., navigates to a different page that is not considered part of the flow), etc. If it is determined that the user has abandoned the flow session, the flow session data generated by the example process is discarded and the example process 1200 completes, as in 1212. In some implementations, an abandonment notification may be recorded. If it is determined that the user has not abandoned the flow session, the example process 1200 returns to block 1206 and continues monitoring the activity of the user and updating the flow session for the user.

Returning to decision block 1208, if it is determined that the user has completed the destination activity, one or more friction scores may be generated based on, for example, the activities recorded in the user flow session between the start activity and the destination activity by the example process 1200, as in 1214. Friction scores may include, but are not limited to, error rate of errors on a page, page latency of page load times for each activity, an overall time for the user to complete the flow between the start activity and the destination activity, the number of page changes required for the user to complete the flow between the start activity and the destination activity, the number of activities performed by the user between the start activity and the destination activity, the number of errors encountered by the user during the flow session, etc.

In addition to generating one or more friction scores, a complexity score indicative of the complexity (e.g., number of steps, page changes, etc.) may also be generated, as in 1216. The complexity score may be computed based on one or more of the number of steps and/or sub-steps required to complete the flow, the number of page changes, the number of errors encountered by the user while completing the flow, the number of times the user has to seek help and/or refer to reference materials/guides, etc.

The example process may also aggregate the friction scores and/or complexity score with other flow sessions from the same or different users for the same flow to generate overall friction scores and/or complexity scores for the flow, as in 1218. For example, each of the different friction scores may be combined, averaged, etc., with respective friction scores from other flow sessions for the same flow to determine overall/average friction scores. Likewise, the complexity score for multiple flow sessions of the same flow may be combined/averaged to generate an overall complexity score for the flow. Such scores may be beneficial to determine, for example, whether changes should be made to help guide a user between the start activity and the destination activity and/or whether changes that were made have improved the flow when compared to prior flows.

Because there may be an infinite flow or progression of activities between a start activity and a destination activity of a flow, in some implementations, all flow sessions may be analyzed to determine which flow path, represented by one or more flow sessions is the most efficient flow path for the flow, as in 1220. The most efficient flow may be measured in terms of total duration of time required to complete the flow, the total number of page changes required to complete the flow, the total number of activities required to complete the flow, etc., or any combination thereof.

Figure 13:
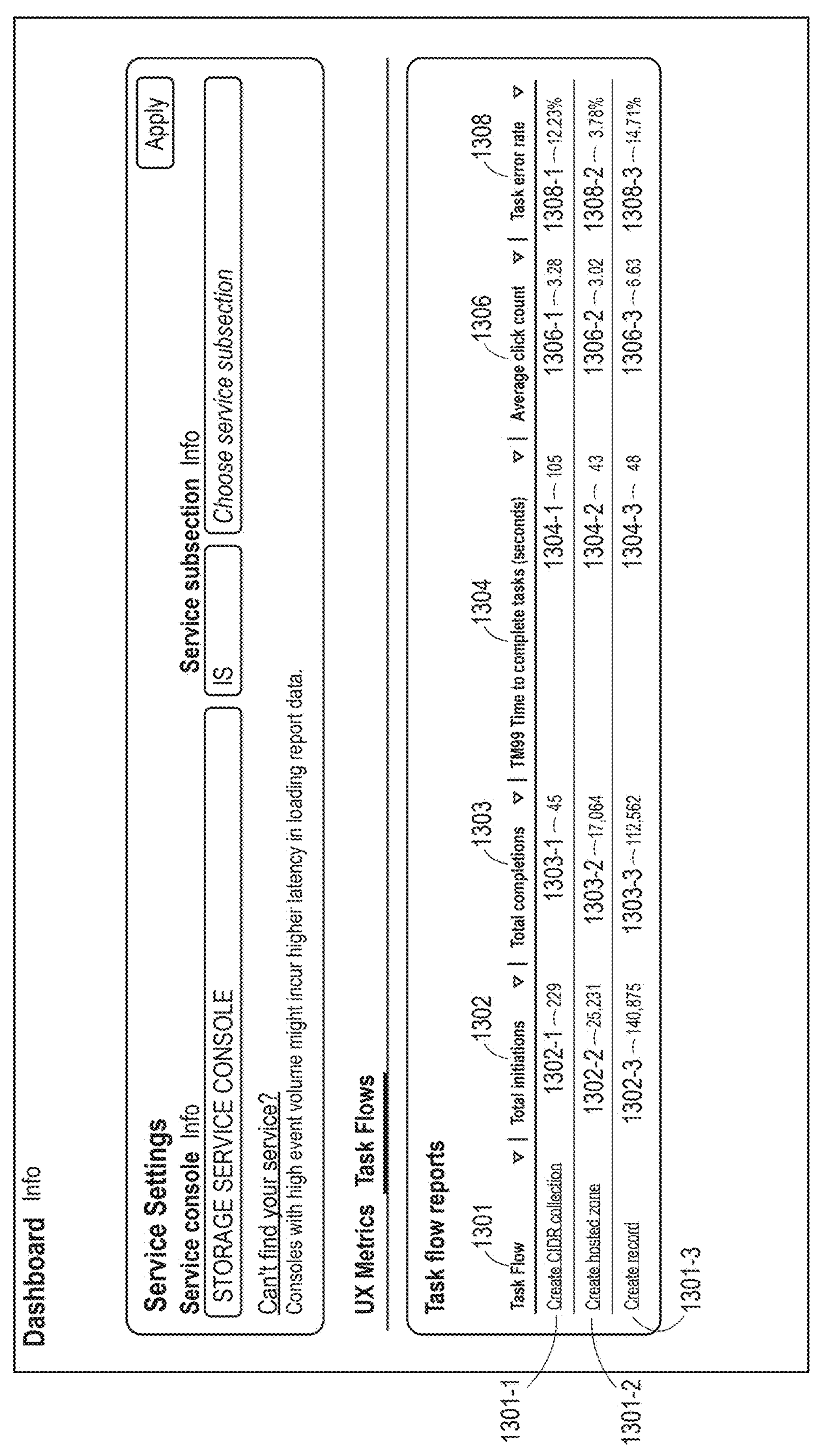
FIG. 13 is an example user interface illustrating best practice scores, in accordance with implementations of the present disclosure.

Finally, the aggregated scores and optionally the most efficient flow path for the flow may be presented, as in 1222. In some implementations, the most efficient flow path may be defined as the best practices flow path for the flow between the start activity and the destination activity of the flow. For example, referring to FIG. 13, illustrated is an example user interface 1300 of best practice scores for different flows, in accordance with implementations of the present disclosure.

In the illustrated example, three task flows 1301 are presented. A Create CIDR collection flow 1301-1, a Create hosted zone flow 1301-2, and a Create record flow 1301-3. As will be appreciated any number of flows may be presented in the user interface and the flows 1301-1, 1301-2, 1301-3 are provided as examples only.

In the illustrated example, the user interface presents, for each flow, Total initiations 1302 indicating the total number of flow sessions initiated in response to determination of a user being at the start activity of the flow. In comparison, the Total completions 1303 indicates the total number of flow sessions generated for the flow in which the flow was successfully completed between the start activity and the destination activity. The TM99 Time to complete the flow 1304 may also be presented indicating the total time required for the flows that successfully completed to progress from the start activity to the destination activity defined for the flow. The average click count 1306 indicates the average number of clicks required for each successfully completed flow to progress from the start activity to the destination activity and the Task error rate 1308 indicates the average number of errors encountered in the successfully completed flows.

In the illustrated example, for task flow "Create CIDR collection" 1301-1 the total iterations 1302-1 is 229 while the Task completions 1303-1 is only 45, indicating that only a small percentage (<20%) of the flows completed successfully. For those flows that completed successfully, the time to complete 1304-1 is 105 seconds, the average click count 1306-1 is 3.28 and the average Task error rate 1308-1 is 12.23%. For flow "Create hosted zone" 1301-2 the total iterations 1302-2 is 25,231 while the Task completions 1303-2 is 17,064, indicating that approximately 67% of the tasks completed successfully. For those flows that completed successfully, the time to complete 1304-2 is 43 seconds, the average click count 1306-2 is 3.02 and the average Task error rate 1308-2 is 3.78%. For flow "Create record" 1301-3 the total iterations 1302-3 is 140,875 while the Task completions 1303-3 is 112,562, indicating that almost 80% of the flows complete successfully. For those flows that completed successfully, the time to complete 1304-3 is 48 seconds, the average click count 1306-3 is 6.63 and the average Task error rate 1308-3 is 14.71%.

Figure 14:
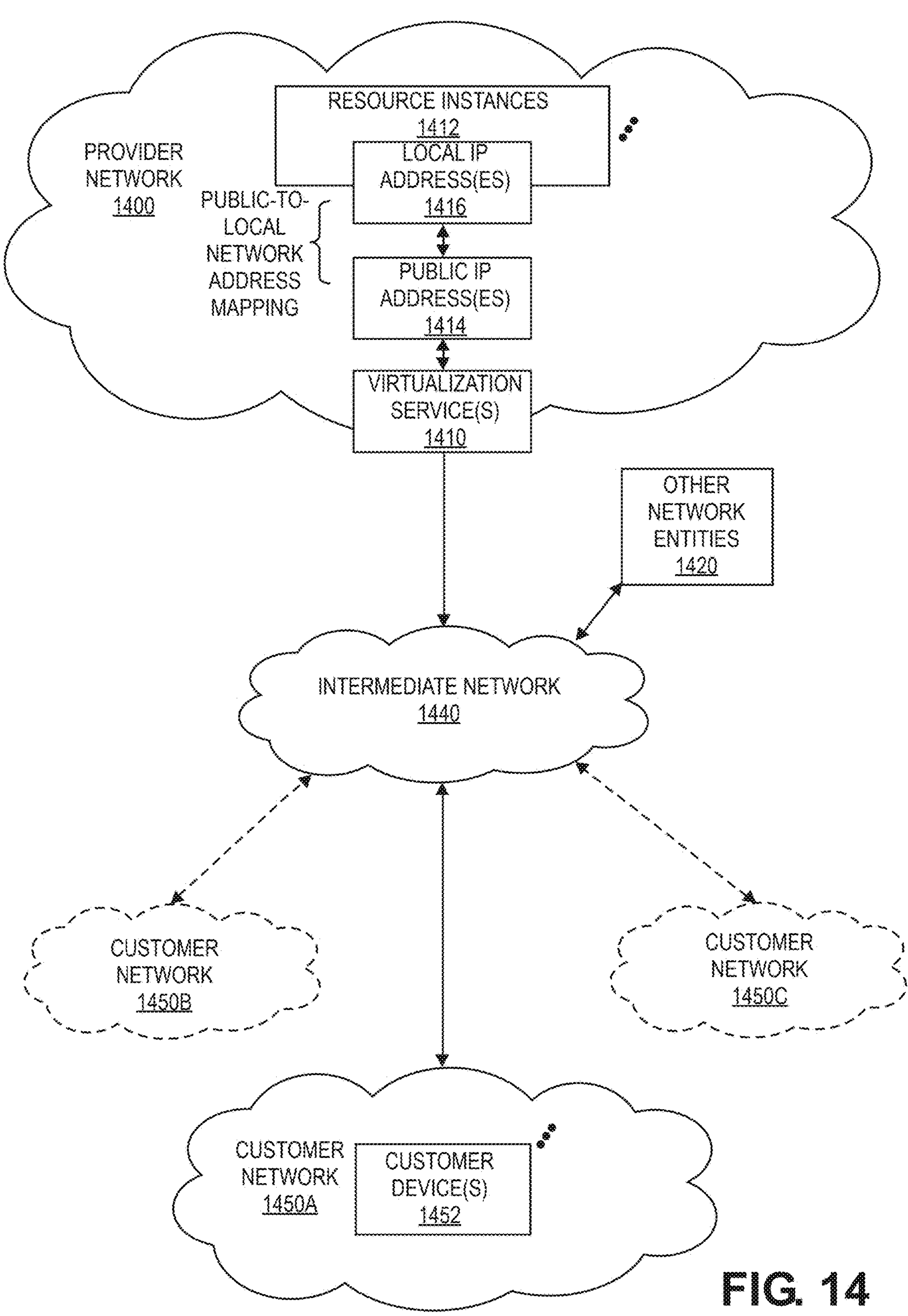
FIG. 14 illustrates an example provider network environment according to some examples.

FIG. 14 illustrates an example provider network environment according to some examples. A provider network 1400 can provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 can be associated with the resource instances 1412; the local IP addresses are the internal network addresses of the resource instances 1412 on the provider network 1400. In some examples, the provider network 1400 can also provide public IP addresses 1414 and/or public IP address ranges (e.g., Internet Protocol version 4 (IPv4) or Internet Protocol version 6 (IPv6) addresses) that customers can obtain from the provider 1400.

Conventionally, the provider network 1400, via the virtualization services 1410, can allow a customer of the service provider (e.g., a customer that operates one or more customer networks 1450A-1450C (or "client networks") including one or more customer device(s) 1452) to dynamically associate at least some public IP addresses 1414 assigned or allocated to the customer with particular resource instances 1412 assigned to the customer. The provider network 1400 can also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of the customer network(s) 1450A-1450C can, for example, implement customer-specific applications and present the customer's applications on an intermediate network 1440, such as the Internet. Other network entities 1420 on the intermediate network 1440 can then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 can be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1400; a customer can then assign their allocated public IP addresses to particular resource instances allocated to the customer. These public IP addresses can be referred to as customer public IP addresses, or simply customer IP addresses. Instead of being assigned by the provider network 1400 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
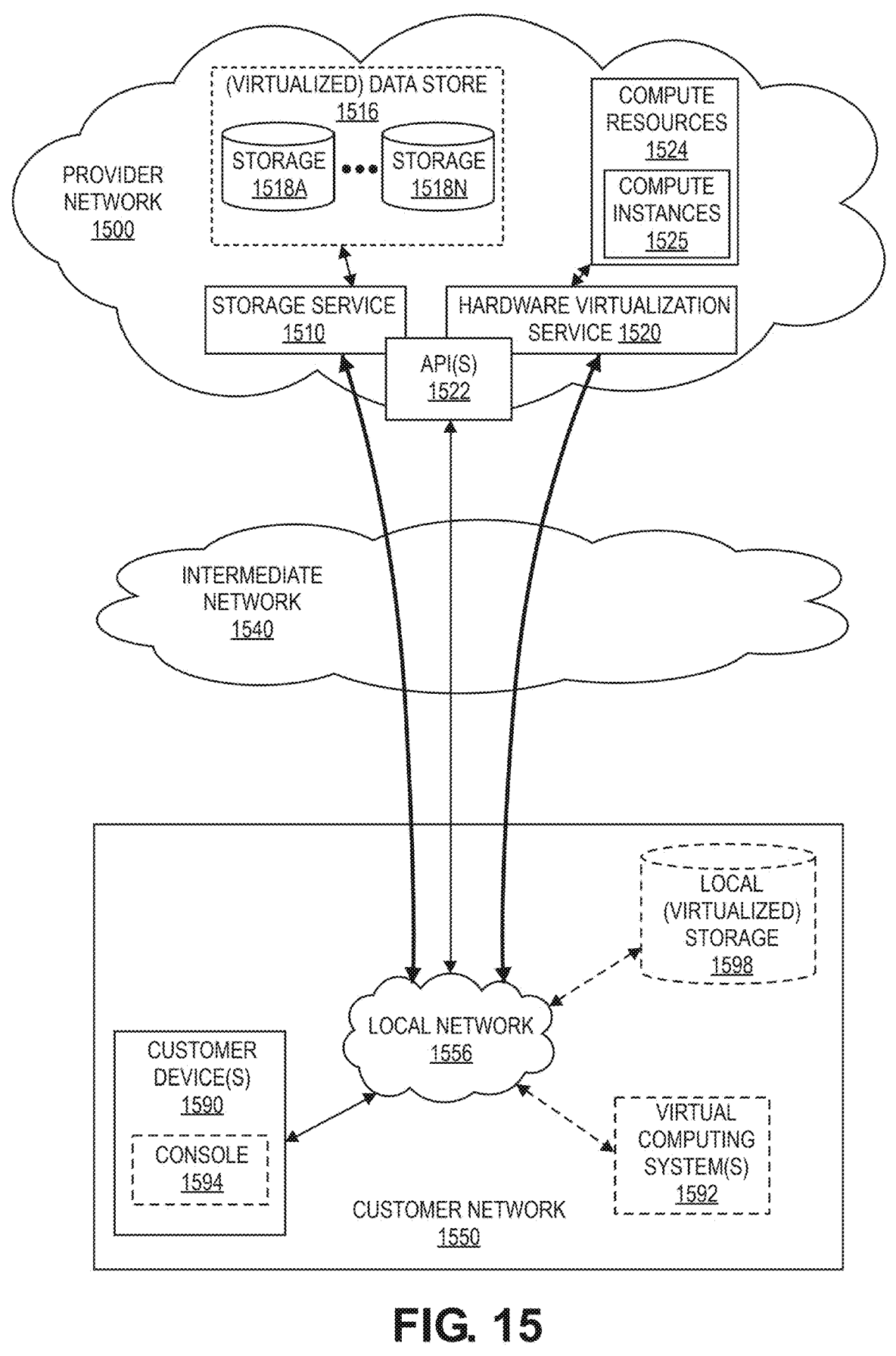

FIG. 15 is a block diagram of an example provider network environment 1500 that provides a storage service and a hardware virtualization service to customers, according to some examples. A hardware virtualization service 1520 provides multiple compute resources 1524 (e.g., compute instances 1525, such as VMs) to customers. The compute resources 1524 can, for example, be provided as a service to customers of a provider network 1500 (e.g., to a customer that implements a customer network 1550). Each computation resource 1524 can be provided with one or more local IP addresses. The provider network 1500 can be configured to route packets from the local IP addresses of the compute resources 1524 to public Internet destinations, and from public Internet sources to the local IP addresses of the compute resources 1524.

The provider network 1500 can provide the customer network 1550, for example coupled to an intermediate network 1540 via a local network 1556, the ability to implement virtual computing systems 1592 via the hardware virtualization service 1520 coupled to the intermediate network 1540 and to the provider network 1500. In some examples, the hardware virtualization service 1520 can provide one or more APIs 1522, for example a web services interface, via which the customer network 1550 can access functionality provided by the hardware virtualization service 1520, for example via a console 1594 (e.g., a web-based application, standalone application, mobile application, etc.) of a customer device 1590. In some examples, at the provider network 1500, each virtual computing system 1592 at the customer network 1550 can correspond to a computation resource 1524 that is leased, rented, or otherwise provided to the customer network 1550.

From an instance of the virtual computing system(s) 1592 and/or another customer device 1590 (e.g., via console 1594), the customer can access the functionality of a storage service 1510, for example via the one or more APIs 1522, to access data from and store data to storage resources 1518A-1518N of a virtual data store 1516 (e.g., a folder or "bucket," a virtualized volume, a database, etc.) provided by the provider network 1500. In some examples, a virtualized data store gateway (not shown) can be provided at the customer network 1550 that can locally cache at least some data, for example frequently accessed or critical data, and that can communicate with the storage service 1510 via one or more communications channels to upload new or modified data from a local cache so that the primary store of data (the virtualized data store 1516) is maintained. In some examples, a user, via the virtual computing system 1592 and/or another customer device 1590, can mount and access virtual data store 1516 volumes via the storage service 1510 acting as a storage virtualization service, and these volumes can appear to the user as local (virtualized) storage 1598.

While not shown in FIG. 15, the virtualization service(s) can also be accessed from resource instances within the provider network 1500 via the API(s) 1522. For example, a customer, appliance service provider, or other entity can access a virtualization service from within a respective virtual network on the provider network 1500 via the API(s) 1522 to request allocation of one or more resource instances within the virtual network or within another virtual network.

Figure 16:
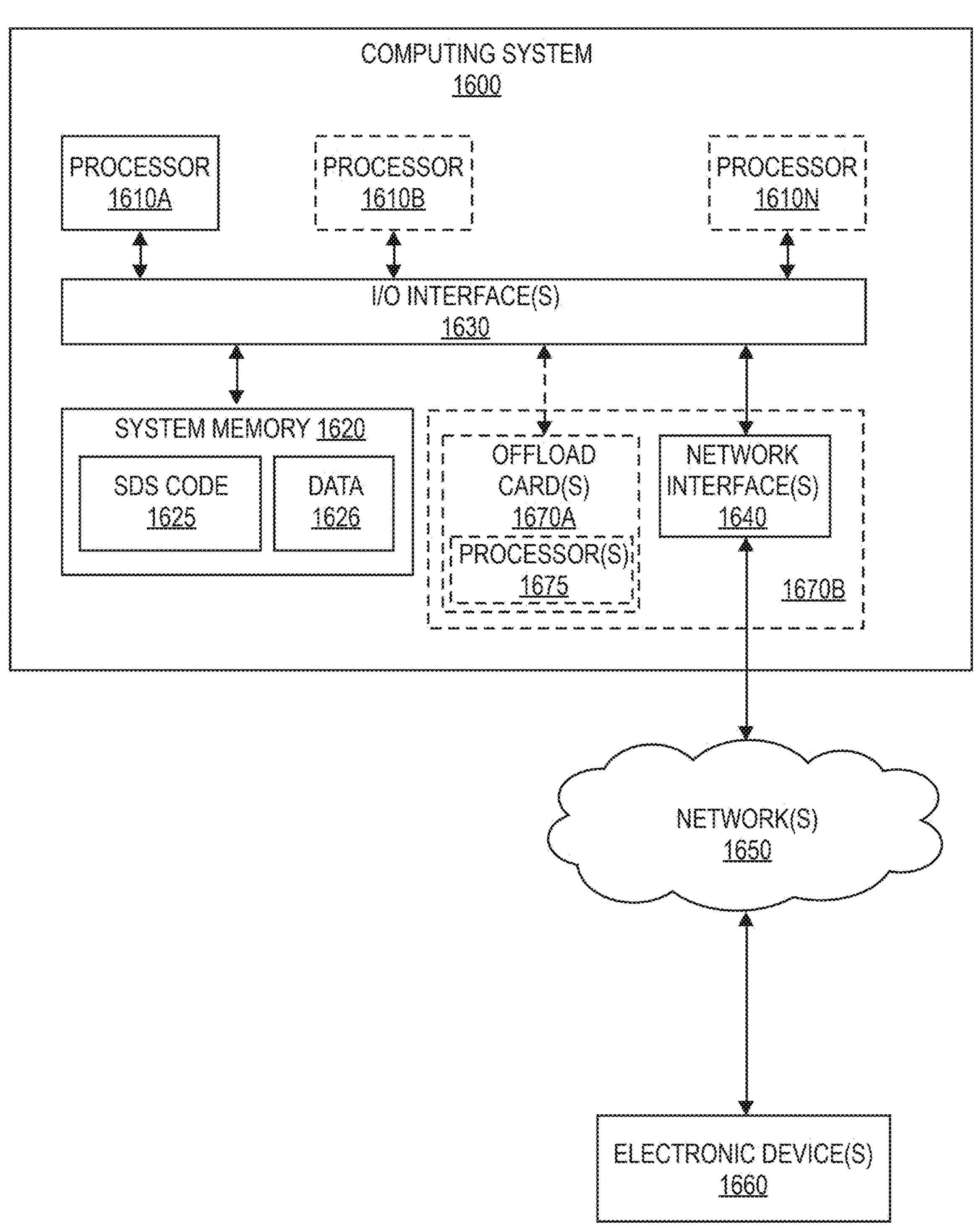
FIG. 16 is a block diagram illustrating an example computer system that can be used in some examples.

In some examples, a system that implements a portion or all of the techniques described herein can include a general-purpose computer system, such as the computer system 1600 (also referred to as a computing device or electronic device) illustrated in FIG. 16, that includes, or is configured to access, one or more computer-accessible media. In the illustrated example, the computer system 1600 includes one or more processors 1610 coupled to a system memory 1620 via an input/output (I/O) interface 1630. The computer system 1600 further includes a network interface 1640 coupled to the I/O interface 1630. While FIG. 16 shows the computer system 1600 as a single computing device, in various examples the computer system 1600 can include one computing device or any number of computing devices configured to work together as a single computer system 1600.

In various examples, the computer system 1600 can be a uniprocessor system including one processor 1610, or a multiprocessor system including several processors 1610 (e.g., two, four, eight, or another suitable number). The processor(s) 1610 can be any suitable processor(s) capable of executing instructions. For example, in various examples, the processor(s) 1610 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1610 can commonly, but not necessarily, implement the same ISA.

The system memory 1620 can store instructions and data accessible by the processor(s) 1610. In various examples, the system memory 1620 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1620 as SDS code 1625 (e.g., executable to implement, in whole or in part, an LLM service such as those described herein) and data 1626.

In some examples, the I/O interface 1630 can be configured to coordinate I/O traffic between the processor 1610, the system memory 1620, and any peripheral devices in the device, including the network interface 1640 and/or other peripheral interfaces (not shown). In some examples, the I/O interface 1630 can perform any necessary protocol, timing, or other data transformations to convert data signals from one component (e.g., the system memory 1620) into a format suitable for use by another component (e.g., the processor 1610). In some examples, the I/O interface 1630 can include support for devices attached through various types of peripheral buses, such as a variant of the Peripheral Component Interconnect (PCI) bus standard or the Universal Serial Bus (USB) standard, for example. In some examples, the function of the I/O interface 1630 can be split into two or more separate components, such as a north bridge and a south bridge, for example. Also, in some examples, some or all of the functionality of the I/O interface 1630, such as an interface to the system memory 1620, can be incorporated directly into the processor 1610.

The network interface 1640 can be configured to allow data to be exchanged between the computer system 1600 and other devices 1660 attached to a network or networks 1650, such as other computer systems or devices as illustrated in FIG. 1, for example. In various examples, the network interface 1640 can support communication via any suitable wired or wireless general data networks, such as types of Ethernet network, for example. Additionally, the network interface 1640 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1600 includes one or more offload cards 1670A or 1670B (including one or more processors 1675, and possibly including the one or more network interfaces 1640) that are connected using the I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1600 can act as a host electronic device (e.g., operating as part of a hardware virtualization service) that hosts compute resources such as compute instances, and the one or more offload cards 1670A or 1670B execute a virtualization manager that can manage compute instances that execute on the host electronic device. As an example, in some examples the offload card(s) 1670A or 1670B can perform compute instance management operations, such as pausing and/or un-pausing compute instances, launching and/or terminating compute instances, performing memory transfer/copying operations, etc. These management operations can, in some examples, be performed by the offload card(s) 1670A or 1670B in coordination with a hypervisor (e.g., upon a request from a hypervisor) that is executed by the other processors 1610A-1610N of the computer system 1600. However, in some examples the virtualization manager implemented by the offload card(s) 1670A or 1670B can accommodate requests from other entities (e.g., from compute instances themselves), and cannot coordinate with (or service) any separate hypervisor.

In some examples, the system memory 1620 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1600 via the I/O interface 1630. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1600 as the system memory 1620 or another type of memory. Further, a computer-accessible medium can include transmission media or signals such as electrical, electromagnetic, or digital signals, conveyed via a communication medium such as a network and/or a wireless link, such as can be implemented via the network interface 1640.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response to requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1518A-1518N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method, comprising:

receiving, a user query with respect to a computing resource of a provider network;

determining a plurality of organizational structure options for presenting content responsive to the user query;

generating an artificial intelligence ("AI") prompt that includes the user query, a session context, the plurality of organizational structure options, and an instruction that an AI system provide a response to the user query that includes a visual structure selected from the plurality of organizational structure options for presenting the content included in the response and an action control that may be presented to a user such that the user may select the action control and cause an action to be performed with respect to the computing resource;

receiving, from the AI system, a visually structured response in accordance with the instruction; and causing a presentation of:

the content of the visually structured response according to the visual structure specified in the visually structured response; and a first action control corresponding to the computing resource referenced in the content.

2. The computer-implemented method of claim 1, wherein generating the AI prompt, includes:

generating a structure AI prompt with instructions that the AI system provide a visual structure for presentation of the content;

generating an actions AI prompt with instructions that the AI system provide a visual action for presentation of an action specified in the content; and combining the visual structure presentation and the visual action presentation to generate the presentation.

3. The computer-implemented method of claim 1, further comprising:

determining a plurality of visual action options that may be used to present the action; and including at least some of the visual action options in the AI prompt.

4. The computer-implemented method of claim 1, further comprising:

comparing a first embedding vector that semantically represents a first segment of a first document of a corpus of documents with a second embedding vector that semantically represents a second segment of a second document of the corpus to determine that the first embedding vector and the second embedding vector form a cluster that includes at least the first embedding vector and the second embedding vector;

in response to determining that the first embedding vector and the second embedding vector form the cluster:

processing, with the AI system, a first content of the first segment and a second content of the second segment to determine that the first content conflicts with the second content;

determining, with the AI system, a suggested revision to at least one of the first content or the second content so that the first content and the second content are aligned and do not conflict;

generating a canonical cluster segment that includes the suggested revision; and presenting at least a portion of the suggested revision as responsive to the user query.

5. The computer-implemented method of claim 1, further comprising:

determining, based at least in part on the visually structured response, an action that may be performed with respect to the computing resource indicated in the content of the visually structured response; and causing the presentation of the first action control that corresponds to the determined action, such that, when the first action control is selected, the action is performed with respect to the computing resource.

6. The computer-implemented method of claim 5, wherein the action modifies a state of the computing resource.

7. A system, comprising:

one or more processors; and a memory storing program instructions that, when executed by the one or more processors, cause the one or more processors to at least:

determine a plurality of organizational structure options for presenting content;

generate an artificial intelligence ("AI") prompt with the plurality of organizational structure options and instructions that an AI system provide a visually structured response indicating an organizational structure selected from the plurality of organizational structure options as to how the content of the visually structured response is to be presented;

receive, from the AI system, the visually structured response that includes the content and the organizational structure indicating how the content is to be presented;

determine, based at least in part on the visually structured response, an action that may be performed with respect to a resource indicated in the content; and cause, concurrent with a first presentation of the content according to the organizational structure, a second presentation of an action control such that, when the action control is selected, the action is performed with respect to the resource.

8. The system of claim 7, wherein the organizational structure is at least one of a table, a bullet list structure, a checklist structure, a graph structure, or a programming layout structure.

9. The system of claim 7, wherein the program instructions that, when executed by the one or more processors, further cause the one or more processors to at least:

determine a first segment of a first document of a document corpus that conflicts with a second segment of a second document of the document corpus;

send a consolidation AI prompt to an AI system that includes a first content of the first segment, a second content of the second segment, and an instruction that the AI system generate a suggested content that accurately describes the first content and the second content such that the first content and the second content are aligned;

update the first content and the second content to include the suggested content; and cause, concurrent with the first presentation, a third presentation of at least a portion of the suggested content.

10. The system of claim 9, wherein the program instructions that, when executed by the one or more processors, further cause the one or more processors to at least:

generate a first embedding vector that semantically represents the first content of the first segment;

generate a second embedding vector that semantically represents the second content of the second segment; and determine, based at least in part on a distance between the first embedding vector and the second embedding vector, that the first embedding vector and the second embedding vector form a cluster.

11. The system of claim 7, wherein the program instructions that, when executed by the one or more processors, cause the one or more processors to at least:

receive, a query with respect to an activity that may be performed during a session;

determine a session summary of the session; and generate the AI prompt based at least in part on the query and the session summary.

12. The system of claim 7, wherein the program instructions that, when executed by the one or more processors, further cause the one or more processors to at least:

determine, based on two or more activities of a session, a session trajectory of the session;

generate a next best activity AI prompt that includes an indication of the session trajectory, a session summary of the session, and an instruction that a next best recommended activity be determined for the session;

receive, from the AI system and responsive to the next best activity AI prompt, a predicted next best action for the session; and present the predicted next best action.

13. The system of claim 7, wherein the program instructions that, when executed by the one or more processors, further cause the one or more processors to at least:

determine a start activity and a destination activity for a flow;

determine that the start activity has been completed during a session;

update a session flow to include an indication of activities performed after the start activity;

determine that the destination activity has been completed as part of the session; and in response to determination that the destination activity has been completed, generate at least one friction score for the flow.

14. The system of claim 13, wherein the friction score is at least one of an error rate, a page latency, a time to complete the flow, a number of page changes during the flow, or a number of activities of the flow.

15. The system of claim 13, wherein the program instructions that, when executed by the one or more processors, further cause the one or more processors to at least:

generate a complexity score indicative of a complexity of the session flow between the start activity and the destination activity.

16. The system of claim 13, wherein the program instructions that, when executed by the one or more processors, further cause the one or more processors to at least:

determine, based at least in part on the session flow and a plurality of other session flows between the start activity and the destination activity, a most efficient flow of activities between the start activity and the destination activity.

17. A computer-implemented method, comprising:

determining a plurality of organizational structure options for presenting content;

generating an artificial intelligence ("AI") system prompt with the plurality of organizational structure options and instructions that the AI system provide a response with the content and an organizational structure selected from the plurality of organizational structure options for presenting the content;

receiving, from the AI system, a response that includes the content and the organizational structure;

determining an action that may be performed with respect to at least one resource indicated in the content;

generating an action control representative of the action such that selection of the action control causes the action to be performed with respect to the at least one resource; and causing a concurrent presentation of the content according to the organizational structure and the action control.

18. The computer-implemented method of claim 17, further comprising:

determining that the action control has been selected;

causing the action to be performed with respect to the at least one resource;

determining, based at least in part on performance of the action, a session trajectory of a session; and determining, based at least in part on the session trajectory, a predicted next best action for the session.

19. The computer-implemented method of claim 18, wherein determining the predicted next best action is further determined based at least in part on one or more of the performance of the action, a session summary of the session, a user context, or a best practices determined for a flow that corresponds with the session trajectory.

20. The computer-implemented method of claim 17, further comprising:

generating, for a session, a session flow that includes an indication of activities performed during the session; and determining, from the session flow, a friction score indicative of at least a number of activities between a start activity and a destination activity of the session flow.

21. The computer-implemented method of claim 17, further comprising:

receiving a query corresponding to the session; and wherein generating the AI system prompt further includes:

generating the AI system prompt with instructions that the AI system provide a response to the query with content and the organizational structure for presenting the content.

* * * * *